United States Patent
Nanba et al.

(10) Patent No.: US 8,237,821 B2
(45) Date of Patent: Aug. 7, 2012

(54) ZOOM LENS AND IMAGE CAPTURING APPARATUS HAVING A CORRECTION UNIT TO CORRECT DISTORTION ABERRATION OF THE IMAGE FORMED BY THE ZOOM LENS AND TO OUTPUT CORRECTED IMAGE DATA

(75) Inventors: Norihiro Nanba, Utsunomiya (JP); Rei Iwama, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 266 days.

(21) Appl. No.: 12/681,274

(22) PCT Filed: Sep. 18, 2008

(86) PCT No.: PCT/JP2008/067374
§ 371 (c)(1),
(2), (4) Date: Apr. 1, 2010

(87) PCT Pub. No.: WO2009/044664
PCT Pub. Date: Apr. 9, 2009

(65) Prior Publication Data
US 2010/0245629 A1    Sep. 30, 2010

(30) Foreign Application Priority Data
Oct. 1, 2007   (JP) .................................. 2007-257368

(51) Int. Cl.
*H04N 5/262* (2006.01)
(52) U.S. Cl. .................................................. 348/240.3
(58) Field of Classification Search ............... 348/240.3, 348/240.1, 240.99; 359/354
See application file for complete search history.

(56) References Cited

U.S. PATENT DOCUMENTS

| | | | |
|---|---|---|---|
| 5,381,268 A | 1/1995 | Sato | |
| 5,905,530 A | 5/1999 | Yokota et al. | |
| 6,498,687 B1 | 12/2002 | Sekita et al. | |
| 6,822,808 B2 | 11/2004 | Nanba et al. | |
| 7,061,685 B2 | 6/2006 | Itoh | |
| 7,209,296 B2 | 4/2007 | Mihara et al. | |
| 7,339,744 B2 | 3/2008 | Hankawa et al. | |
| 7,471,459 B2 | 12/2008 | Hankawa et al. | |

(Continued)

FOREIGN PATENT DOCUMENTS
JP    2-252375 A    10/1990

(Continued)

OTHER PUBLICATIONS
International Search Report issued in related PCT/JP2008/067374, mailed Oct. 28, 2008.

*Primary Examiner* — Jason Chan
*Assistant Examiner* — Gary C Vieaux
(74) *Attorney, Agent, or Firm* — Rossi, Kimms & McDowell LLP

(57) ABSTRACT

An image capturing apparatus includes a zoom lens, a solid-state image sensor which photoelectrically converts an image formed by the zoom lens, a processing unit which processes image data obtained by the solid-state image sensor, and a correction units which processes the image data from the processing unit to correct distortion aberration of the image formed by the zoom lens, and outputs the corrected image data. The lens arrangement of the zoom lens, and the length of the diagonal line of the image capturing area in correcting distortion aberration are appropriately set.

13 Claims, 12 Drawing Sheets

U.S. PATENT DOCUMENTS

| | | |
|---|---|---|
| 2006/0139767 A1* | 6/2006 | Lee et al. ................ 359/684 |
| 2006/0187323 A1 | 8/2006 | Kobayashi et al. |
| 2007/0121217 A1 | 5/2007 | Hozumi et al. |

FOREIGN PATENT DOCUMENTS

| | | |
|---|---|---|
| JP | 5-249374 A | 9/1993 |
| JP | 6-181530 A | 6/1994 |
| JP | 2001-066503 A | 3/2001 |
| JP | 2001-281545 A | 10/2001 |
| JP | 2005-134746 A | 5/2005 |
| JP | 2006-047537 A | 2/2006 |
| JP | 2006-284790 A | 10/2006 |
| JP | 2006-330675 A | 12/2006 |
| JP | 2007-133133 A | 5/2007 |
| JP | 2007-322788 A | 12/2007 |

* cited by examiner

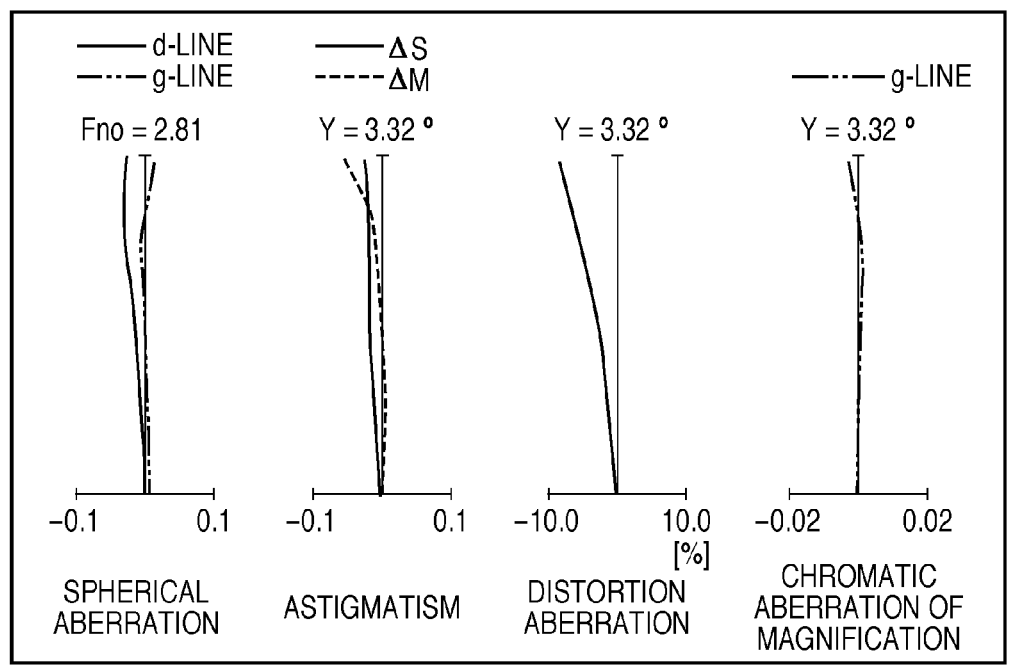
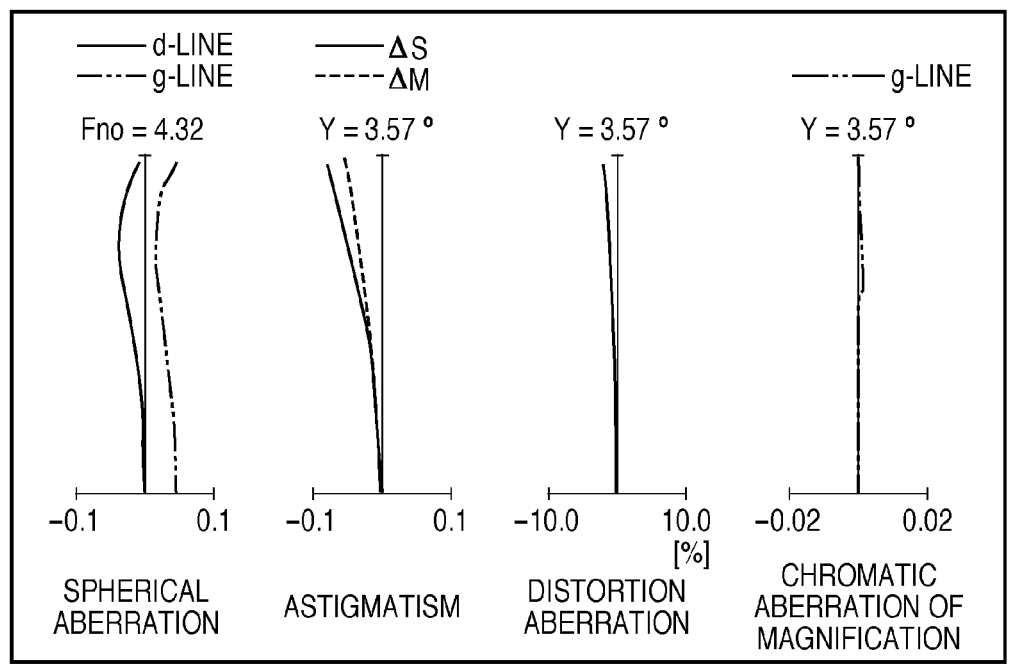

F I G. 8
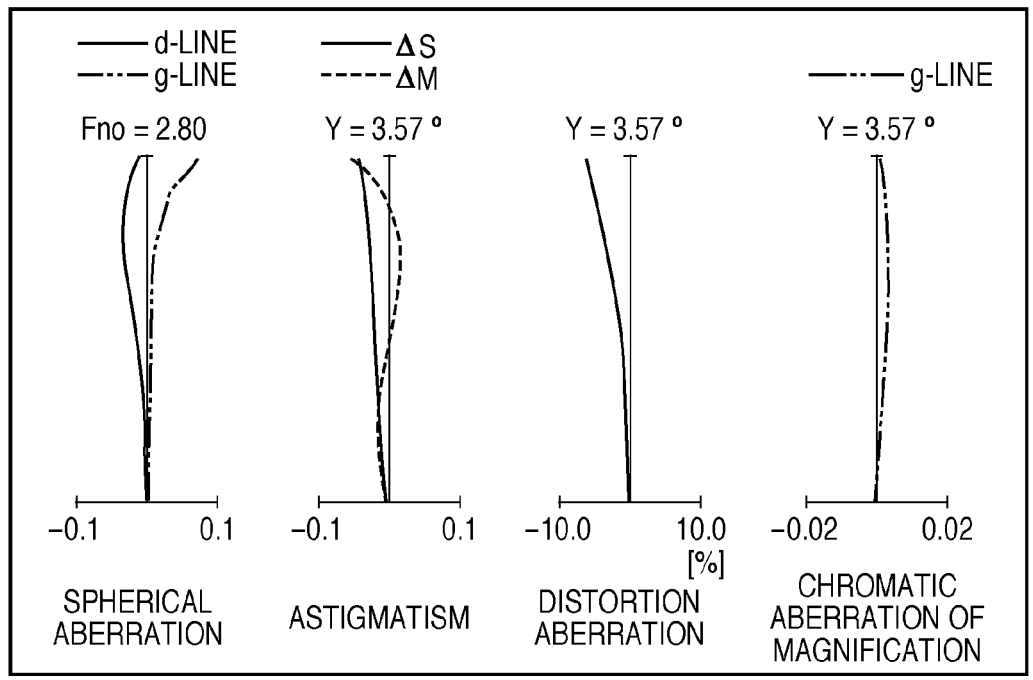
F I G. 9
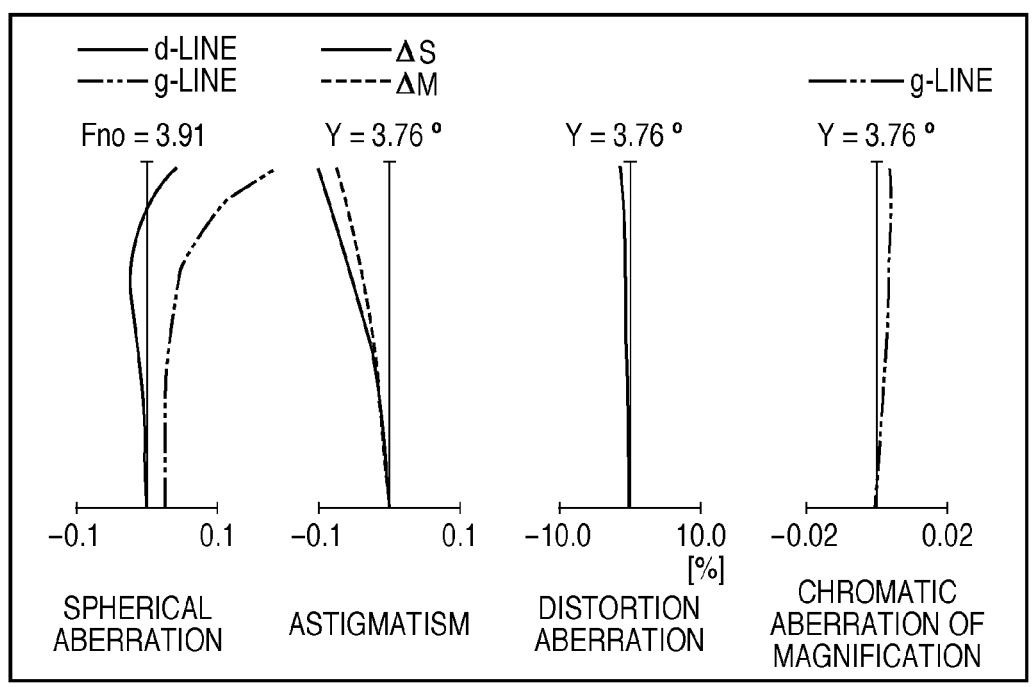

ZOOM LENS AND IMAGE CAPTURING APPARATUS HAVING A CORRECTION UNIT TO CORRECT DISTORTION ABERRATION OF THE IMAGE FORMED BY THE ZOOM LENS AND TO OUTPUT CORRECTED IMAGE DATA

This application is a U.S. National Phase Application of PCT International Application PCT/JP2008/067374 filed on Sep. 18, 2008 which is based on and claims priority from JP 2007-257368 filed on Oct. 1, 2007 the contents of which is incorporated herein in its entirety by reference.

TECHNICAL FIELD

The present invention relates to a zoom lens suitable for a still camera, video camera, digital still camera, surveillance camera, and the like, and an image capturing apparatus having the zoom lens.

BACKGROUND ART

Recently, image capturing apparatuses (cameras) such as a video camera and digital still camera using solid-state image sensors require a compact, wide-angle zoom lens.

As a compact, wide-angle zoom lens, there is known a negative lead type zoom lens which has a lens unit of negative refractive power on the most object side and is formed from a plurality of lens units as a whole.

A known example of the negative lead type zoom lens is a 2-unit zoom lens which includes, sequentially from the object side to the image side, a first lens unit L1 of negative refractive power and a second lens unit L2 of positive refractive power, and performs zooming by moving the respective lens units (Japanese Patent Laid-Open No. 05-249374).

Another example is a 3-unit zoom lens which includes, sequentially from the object side to the image side, a first lens unit of negative refractive power, a second lens unit of positive refractive power, and a third lens unit of positive refractive power, performs zooming by moving the respective lens units, and has good telecentricity on the image side (Japanese Patent Laid-Open Nos. 2001-66503 and 2001-281545).

Japanese Patent Laid-Open Nos. 2001-66503 and 2001-281545 each disclose a compact zoom lens having a first lens unit made up of negative and positive lenses.

Generally in the negative lead type zoom lens, a larger angle of view increases negative distortion aberration on the wide-angle end. Optically correcting the negative distortion aberration requires many lenses, and it is very difficult to sufficiently correct such aberration.

For this reason, there has conventionally been known a zoom lens which corrects negative distortion aberration not optically but electrically (Japanese Patent Laid-Open Nos. 2006-47537, 2006-284790, 2006-330675, and 2-252375).

A known example of the zoom lens which electrically corrects negative distortion aberration is one which makes correction only in the zoom range where negative distortion aberration becomes large (Japanese Patent Laid-Open No. 6-181530).

The negative lead type zoom lens in which a lens unit of negative refractive power precedes has a feature capable of easily achieving downsizing and a wide angle of view.

However, the entire zoom lens is asymmetric, so distortion aberration readily occurs on the wide-angle end.

The negative distortion aberration becomes large as the angle of view of the zoom lens increases.

Various methods of electrically correcting negative distortion aberration have been proposed.

However, even by the method of simply making electrical correction of distortion aberration, it is difficult to sufficiently correct distortion aberration on the entire plane and maintain high optical performance while decreasing the front lens diameter and downsizing the zoom lens.

When electrically correcting distortion aberration, consideration should be made regarding the generation state (generation amount) of distortion aberration in each zoom range of the zoom lens, the lens arrangement, and the like; otherwise, it is very difficult to satisfactorily correct distortion aberration in all zoom ranges and obtain high optical performance (high-quality image) while decreasing the front lens diameter and downsizing the zoom lens.

DISCLOSURE OF INVENTION

It is an object of the present invention to provide a zoom lens capable of decreasing the front lens diameter, downsizing the entire system, making sufficient electrical correction of distortion aberration, and obtaining high optical performance, and an image capturing apparatus having the zoom lens.

According to the present invention, there is provided an image capturing apparatus comprising:

a zoom lens;

a solid-state image sensor which photoelectrically converts an image formed by the zoom lens;

processing means for processing image data obtained by the solid-state image sensor; and correction means for processing the image data from the processing means to correct distortion aberration of the image formed by the zoom lens, and outputting the corrected image data, wherein the zoom lens has, sequentially from an object side to an image side, a first lens unit of negative refractive power and a second lens unit of positive refractive power, the lens units move to narrow an interval between the first lens unit and the second lens unit in zooming from the wide-angle end to the telephoto end, the first lens unit includes one negative lens and one positive lens, the correction means corrects distortion aberration in accordance with each zoom position of the zoom lens, when the correction means is to correct negative distortion aberration, the correction means performs correction using image information obtained from area A smaller than a maximum image capturing area of the solid-state image sensor, and a size of a diagonal line of area A at this time is defined as a length of a diagonal line of an image capturing area, and when the correction means does not correct negative distortion aberration, a size of a diagonal line of the maximum image capturing area of the solid-state image sensor is defined as a length of a diagonal line of an image capturing area, and letting Ldw and Ldt be lengths of diagonal lines of image capturing areas on the wide-angle end and the telephoto end, f1 be a focal length of the first lens unit of the zoom lens, f2 be a focal length of the second lens unit, fw be a focal length of an entire system on the wide-angle end, R11 and R12 be radii of curvature of an object-side lens surface and image-side lens surface of the negative lens of the first lens unit (for an aspherical surface, radii of curvature of reference spherical surfaces), and D be an outer diameter of a most object-side lens of the first lens unit, conditions:

$$1.7 < f1/fw < 2.4$$

$$1.6 < f2/fw < 2.5$$

$$0.80 < Ldw/Ldt < 0.96$$

$$2.0 < (R11 \times R12)/(D \times Ldw) < 20.0$$

are satisfied.

Further features of the present invention will become apparent from the following description of exemplary embodiments with reference to the attached drawings.

BRIEF DESCRIPTION OF DRAWINGS

FIG. 4 is a view of aberrations on the wide-angle end according to the first embodiment;

FIG. 5 is a view of aberrations at an intermediate position according to the first numerical embodiment;

FIG. 8 is a view of aberrations on the wide-angle end according to the second numerical embodiment;

FIG. 9 is a view of aberrations at an intermediate position according to the second numerical embodiment;

BEST MODE FOR CARRYING OUT THE INVENTION

Preferred embodiments of an image capturing apparatus according to the present invention will be described.

The image capturing apparatus according to the present invention comprises a zoom lens and a solid-state image sensor which photoelectrically converts an image formed by the zoom lens.

The image capturing apparatus further comprises a processing means for processing image data obtained by the solid-state image sensor, and a correction means for processing image data from the processing means to correct distortion aberration of an image formed by the zoom lens, and outputting the corrected image data.

First Embodiment

Figure 1:
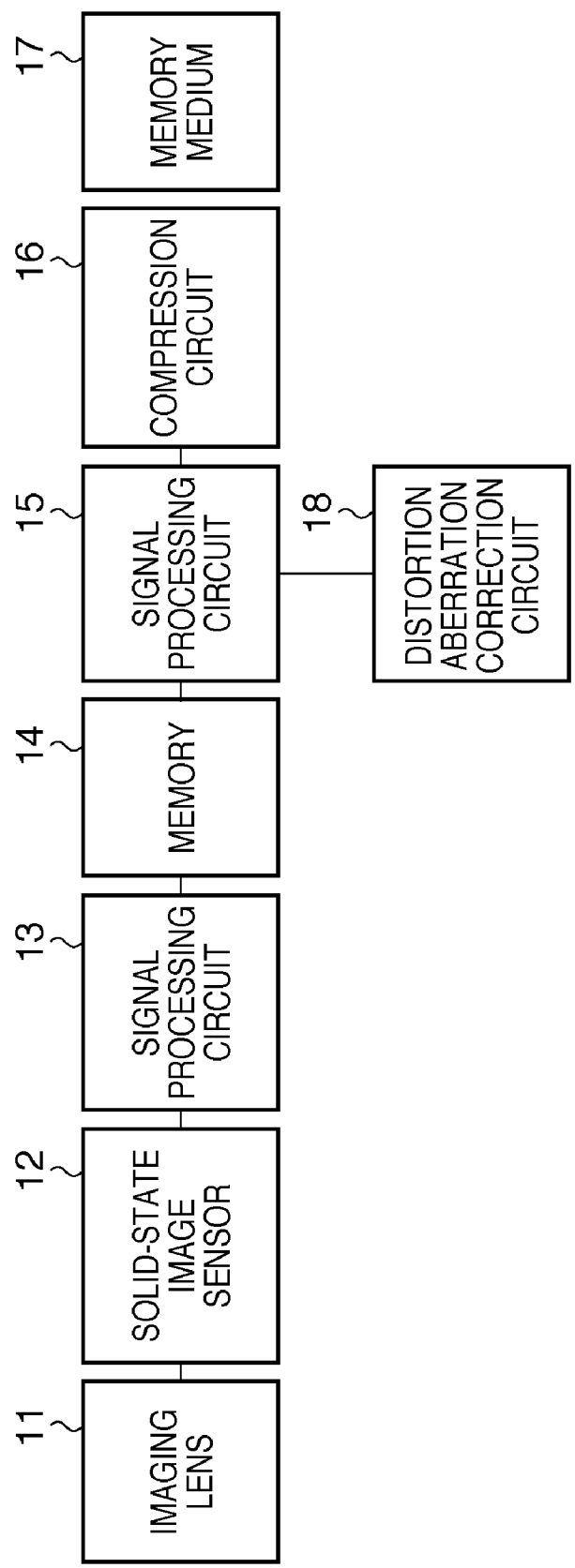
FIG. 1 is a block diagram showing the basic arrangement of an image capturing apparatus according to the present invention.

FIG. 1 is a block diagram showing the arrangement of the main part of an image capturing apparatus according to the present invention.

In FIG. 1, an imaging lens (zoom lens) 11 has a zooming function. A solid-state image sensor 12 photoelectrically converts an image formed by the imaging lens 11.

A signal processing circuit 13 generates a digital signal of image information. A memory 14 stores a digital signal.

A signal processing circuit 15 processes image data. A compression circuit 16 and memory medium 17 are also arranged. A distortion aberration correction circuit (distortion correction circuit or correction means) 18 corrects distortion aberration of image data.

The signal processing circuit 13, memory 14, and signal processing circuit 15 build one element of the processing means for processing image data. An object image formed by the imaging lens 11 is formed on the image sensing plane of the solid-state image sensor 12. The solid-state image sensor 12 photoelectrically converts the object image, converts image information of the object image into an electrical signal, and transfers the electrical signal to the signal processing circuit 13.

The signal processing circuit 13 performs noise removal, amplification, and the like for the electrical signal, and then converts the electrical signal into a digital signal. The memory 14 temporarily stores the digital signal. The signal processing circuit 15 performs necessary digital signal processing for the digital signal from the memory 14, generating image data.

When the distortion aberration correction circuit 18 does not correct distortion aberration for image information, the signal processing circuit 15 sends the image data to the compression circuit 16.

The compression circuit 16 performs data compression corresponding to a predetermined format of image data. The compressed data is stored in the memory medium 17 such as a flash memory.

The zoom position of the imaging lens 11 is managed based on information (zoom position information) obtained from a zoom position detection means (not shown).

When correcting distortion aberration for image information by the distortion aberration correction circuit 18 on the basis of a signal input from an external device, the signal processing circuit 15 inputs the image data to the distortion aberration correction circuit 18.

For example, for a zoom position suffering a large distortion aberration among all the zoom ranges of the imaging lens 11, the signal processing circuit 15 sends image data to the distortion aberration correction circuit 18.

The distortion aberration correction circuit 18 corrects distortion aberration by processing the image data generated by the signal processing circuit 15.

The data corrected by the distortion aberration correction circuit 18 is sent back to the signal processing circuit 15, and then transferred to the compression circuit 16. The distortion aberration correction circuit 18 may also be incorporated in the signal processing circuit 15.

If the amount of distortion aberration of the imaging lens 11 is allowable, the distortion aberration need not always be corrected. Distortion aberration may also be corrected only at a zoom position where distortion aberration of the imaging lens 11 exceeds the allowance.

A distortion aberration correction method by the distortion aberration correction circuit 18 can be a known method, such as methods disclosed in Japanese Patent Laid-Open Nos. 2006-47537, 2006-284790, 2006-330675, 2-252375, and 6-181530.

Figure 2:
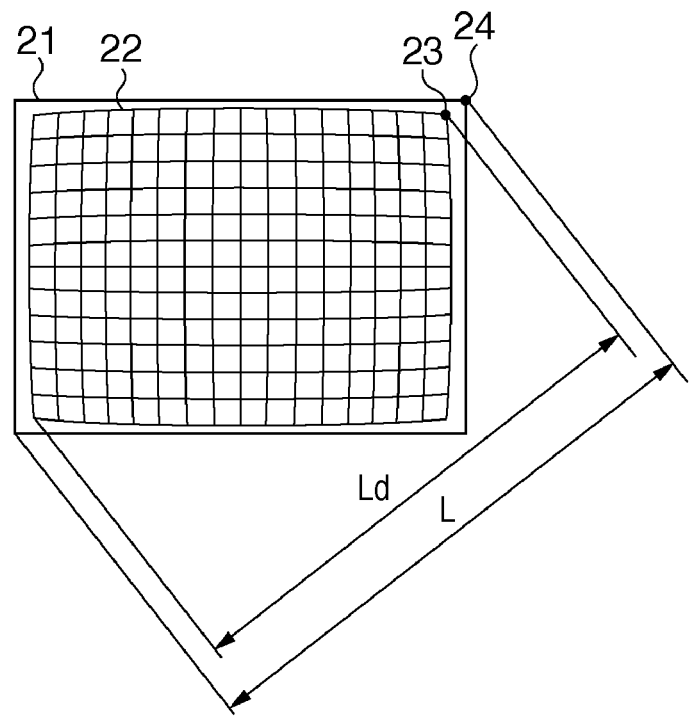
FIG. 2 is a view showing the concept of distortion aberration correction according to the present invention.

FIG. 2 is a conceptual view of the distortion aberration correction circuit 18 in FIG. 1 correcting distortion aberration.

In FIG. 2, reference numeral 21 denotes a maximum image capturing area on the image sensing plane of the solid-state image sensor 12. L represents the length of the diagonal line of the maximum image capturing area 21.

When the imaging lens 11 is free from distortion aberration, an ideal imaging relation shown below is established:

$$L/2 = f \times \tan\theta,$$

where f is the focal length of the imaging lens 11, and θ is the half angle of view.

When the imaging lens 11 suffers distortion aberration, this relation cannot be established. If the imaging lens 11 has barrel distortion aberration, i.e., negative distortion aberration, $$L/2 > f \times \tan\theta$$

At this time, an off-axis imaging point on the image sensing plane deviates toward the center of the plane from an ideal imaging point free from any distortion (distortion aberration). When the image height is large and a large amount of negative distortion aberration occurs, the deviation amount increases toward the center of the plane as the imaging point comes close to the periphery of the plane.

In FIG. 2, reference numeral 22 denotes an image capturing area (area A) having a barrel-like contour smaller than the maximum image capturing area 21 of the solid-state image sensor 12.

A length Ld of the diagonal line of the image capturing area 22 corresponds to the half angle θ of view. Thus, by expanding image information of the image capturing area 22 to the size of the image capturing area 21, image information at the half angle θ of view can be generated with an original (ideal) image capturing size (image capturing area).

In FIG. 2, the diagonal corners of the image capturing areas 21 and 22 will be explained. Along the diagonal line (half angle θ of view), the image point exists not at an ideal imaging point 24 but at an imaging point 23 owing to distortion aberration of the imaging lens 11. To solve this, when expansion is radially done to make the imaging point 23 coincide with the imaging point 24, i.e., distortion aberration is electrically corrected, $$L/2 = f \times \tan\theta$$

can be established to correct distortion aberration.

This conversion (correction) is executed at each point on the contour of the image capturing area 22, correcting distortion aberration of the contour.

Even for points inside the contour, geometrical transform is radially executed based on a distortion aberration amount corresponding to the image height of the imaging lens 11, correcting distortion aberration at each image height.

Conversion from the image capturing area 22 to the image capturing area 21 increases the number of pixels. Thus, necessary interpolation processing is done after geometrical transform to generate image data. This processing is performed at each zoom position or a necessary zoom range.

Although this correction completely cancels distortion aberration according to a known method, it is also possible not to completely correct distortion aberration, making the correction slightly incomplete.

It is known that barrel (negative) distortion aberration gives less visual unnaturalness than pin-cushion (positive) distortion aberration as long as the amount of barrel distortion aberration is small.

To prevent pin-cushion distortion aberration including variations of the imaging lens ii, the correction amount is decreased to leave barrel distortion aberration to a certain degree.

When the distortion aberration correction amount is decreased, the relation:

$$L/2 > f \times \tan\theta$$

does not change, but correction is executed to reduce the difference between the left- and right-hand sides.

Features of the image capturing apparatus having the imaging lens (zoom lens) 11 in the first embodiment will be explained.

The zoom lens 11 in the first embodiment has, sequentially from the object side to the image side, the first lens unit of negative refractive power and the second lens unit of negative refractive power. One or more lens units may also be arranged on the image side of the second lens unit.

The respective lens units move to narrow the interval between the first and second lens units in zooming from the wide-angle end to the telephoto end. The first lens unit includes one negative lens and one positive lens.

The correction means (distortion aberration correction circuit) 18 corrects distortion aberration in accordance with each zoom position of the zoom lens 11.

When correcting negative distortion aberration by the correction means 18, the correction means 18 performs correction using image information obtained from area A (image capturing area 22) smaller than the maximum image capturing area 21 of the solid-state image sensor. The diagonal size of area A at this time is defined as the length Ld of the diagonal line of the image capturing area.

When not correcting negative distortion aberration, the diagonal size of the maximum image capturing area of the solid-state image sensor 12 is defined as the length L of the diagonal line of the image capturing area.

Let Ldw and Ldt be the lengths of the diagonal lines of image capturing areas on the wide-angle end and telephoto end. Let f1 be the focal length of the first lens unit of the zoom lens 11, f2 be the focal length of the second lens unit, and fw be the focal length of the entire system on the wide-angle end.

Let R11 and R12 be the radii of the curvatures of the object-side and image-side lens surfaces of the negative lens of the first lens unit (for an aspherical surface, the radii of curvature of reference spherical surfaces). Let D be the outer diameter of the most object-side lens of the first lens unit.

At this time, following conditions are satisfied:

$$1.7 < f1/fw < 2.4 \quad (1)$$

$$1.6 < f2/fw < 2.5 \quad (2)$$

$$0.80 < Ldw/Ldt < 0.96 \quad (3)$$

$$2.0 < (R11 \times R12)/(D \times Ldw) < 20.0 \quad (4)$$

Conditional expression (1) defines the focal length, i.e., refractive power of the first lens unit. If the focal length is much smaller than the lower limit of conditional expression (1), the refractive power becomes too high. As a result, the curvature of field on the wide-angle end, and spherical aberration and coma on the telephoto end frequently occur. It becomes difficult to form the first lens unit from two lenses.

If the number of building lenses is increased to correct aberration, the size of the first lens unit undesirably increases. If the focal length is much larger than the upper limit, the refractive power becomes too low. The refractive power of a retrofocus arrangement weakens, and an outer diameter (effective diameter) D of the negative lens increases. Further, it becomes difficult to ensure on the image side a back focal length for inserting a filter or the like.

Conditional expression (2) defines the focal length, i.e., refractive power of the second lens unit. If the focal length is much smaller than the lower limit of conditional expression (2) and the refractive power is high, the Petzval sum becomes large, and the curvature of field is not sufficiently corrected. If the focal length is much larger than the upper limit and the refractive power is low, the moving stroke of each lens unit for obtaining a desired zoom ratio increases. The total length (length from the first lens surface to the image plane) undesirably increases on the telephoto end.

Conditional expression (3) defines the ratio of the length of the diagonal line of the image capturing area on the wide-angle end to that on the telephoto end. If the length of the diagonal line of the image capturing area on the wide-angle end is much smaller than the lower limit of conditional expression (3), the expansion amount in correcting distortion aberration becomes too large, degrading the image quality upon pixel interpolation. If the length of the diagonal line of the image capturing area on the wide-angle end is much larger than the upper limit, the expansion amount in correcting distortion aberration becomes too small. This makes it difficult to decrease the outer diameter D of the lens.

Conditional expression (4) defines the radius of curvature of each lens surface of the negative lens which forms the first lens unit. If the radius of curvature is much smaller than the lower limit of conditional expression (4), distortion aberration comes close to a shape concentric with an off-axis beam and becomes too small on the wide-angle end.

Hence, the expansion amount in correcting distortion aberration cannot be ensured, and it becomes difficult to decrease the outer diameter D of the lens. If the radius of curvature is much larger than the upper limit, an excessively large distortion aberration occurs, degrading the image quality upon correcting distortion aberration. Also, astigmatism frequently occurs on the wide-angle end.

The numerical ranges of conditional expressions (1) to (4) are more preferably set as follows:

$$1.80 < f1/fw < 2.38 \quad (1a)$$

$$1.70 < f2/fw < 2.40 \quad (2a)$$

$$0.85 < Ldw/Ldt < 0.96 \quad (3a)$$

$$2.2 < (R11 \times R12)/(D \times Ldw) < 19.0 \quad (4a)$$

Each embodiment can provide a negative lead type zoom lens with a high zoom ratio and small front lens diameter for which aberrations are satisfactorily corrected in the entire zoom range.

A zoom lens used in the image capturing apparatus of the present invention more preferably satisfies at least one of the following conditions.

Accordingly, effects corresponding to the respective conditional expressions can be obtained.

Let R21 and R22 be the radii of curvature of the object-side and image-side lens surfaces of the positive lens of the first lens unit (for an aspherical surface, the radii of curvature of reference spherical surfaces).

Let N1n be the refractive index of the material of the negative lens of the first lens unit.

Let R21 be the radius of curvature of the object-side lens surface of the positive lens of the first lens unit.

Let d1 be the thickness (distance from the first lens surface of the first lens unit to the final lens surface of the first lens unit) of the first lens unit on the optical axis.

Let DIw be distortion aberration of the most off-axis beam (maximum image height) on the wide-angle end of the zoom lens.

When the zoom lens has one or more lens units of positive refractive power on the image side of the second lens unit, let fk be the focal length of the most image-side lens unit of positive refractive power.

At this time, at least one of conditions:

$$1.2 < (R21 \times R22)/(D \times Ldw) < 3.0 \quad (5)$$

$$1.83 < N1n \quad (6)$$

$$-5.0 < (R12 + R21)/(R12 - R21) < -3.0 \quad (7)$$

$$0.5 < d1/fw < 1.3 \quad (8)$$

$$0 < (1/(Ldw/Ldt) - 1) \times 100 < 100 < |DIw| \quad (9)$$

$$4.0 < fk/fw < 8.0 \quad (10)$$

is preferably satisfied.

Conditional expression (5) defines the radius of curvature of each lens surface of the positive lens which forms the first lens unit. If the radius of curvature is much smaller than the lower limit of conditional expression (5), spherical aberration frequently occurs on the telephoto end. In addition, spherical aberration is not sufficiently corrected for the first lens unit as a whole.

If the radius of curvature is much larger than the upper limit, chromatic aberration of magnification is excessively corrected on the wide-angle end.

Conditional expression (6) defines the refractive index of the material of the negative lens of the first lens unit. If the refractive index is much lower than the lower limit of conditional expression (6), the Petzval sum becomes excessively large in the negative direction when the negative lens has a desired refractive power. As a result, the curvature of field is excessively corrected.

Conditional expression (7) defines the form factor of an air lens formed from the negative and positive lenses of the first lens unit. If the form factor is smaller than −1 in conditional expression (7), this means a meniscus shape whose convex surface faces the object side.

If the degree of meniscus exceeds the lower limit and becomes too high, many high-order components of spherical aberration and coma are generated on the telephoto end. If the degree of meniscus exceeds the upper limit and becomes too low, a large amount of astigmatism is generated on the wide-angle end.

Conditional expression (8) defines the thickness of the first lens unit on the optical axis. If the thickness is much smaller than the lower limit of conditional expression (8), the thicknesses of the negative and positive lenses become small, and their refractive powers become excessively low.

If the refractive powers of the respective lenses become excessively low, chromatic aberration of the first lens unit is not satisfactorily corrected. If the thickness is much larger than the upper limit, the outer diameter D of the negative lens increases. This makes it difficult to downsize the entire first lens unit.

Conditional expression (9) defines the correction amount when correcting distortion aberration. (Ldw/Ldt) represents the ratio of the length of the diagonal line of the image capturing area on the wide-angle end to that on the telephoto end. A reciprocal 1/(Ldw/Ldt) represents the ratio when expanding the length of the diagonal line of the image capturing area on the wide-angle end to that on the telephoto end.

(1/(Ldw/Ldt)−1)×100 represents, in percentage, the ratio of the expansion amount to the length of the diagonal line of the image capturing area on the wide-angle end. On the premise that distortion aberration is corrected, the expansion amount takes a value larger than 0. Assuming that the expansion amount exceeds distortion aberration on the wide-angle end corresponding to the upper limit of conditional expression (9), corrected distortion aberration becomes pin-cushion distortion aberration. When pin-cushion distortion aberration on the wide-angle end is not visually preferable, the correction is regarded excessive. To prevent generation of pin-cushion distortion aberration after correcting distortion aberration, conditional expression (9) is preferably satisfied.

Conditional expression (10) defines the focal length, i.e., refractive power of a lens unit of positive refractive power arranged on the most image side when the zoom lens according to the present invention is formed from three or more lens units. If the focal length is much smaller than the lower limit of conditional expression (10) and the refractive power is high, the Petzval sum becomes excessively large, and the curvature of field is not sufficiently corrected.

If the focal length is much larger than the upper limit and the refractive power is low, the effect of moving the exit pupil of the final lens unit serving as a field lens apart from the image plane undesirably weakens. When the final lens unit performs focusing, the extension amount for focusing on a nearby object increases. This makes it difficult to downsize the zoom lens including the lens barrel.

The numerical ranges of conditional expressions (5) to (9) are more preferably set as follows:

$$1.25 < (R21 \times R22)/(D \times Ldw) < 2.90 \quad (5a)$$

$$1.84 < N1n \quad (6a)$$

$$-4.80 < (R12+R21)/(R12-R21) < -3.2 \quad (7a)$$

$$0.6 < d1/fw < 1.2 \quad (8a)$$

$$2.0 < (1/(Ldw/Ldt)-1) \times 100 < |DIw| \quad (9a)$$

$$4.05 < fk/fw < 7.00 \quad (10a)$$

Embodiments of an imaging lens (zoom lens) used in the image capturing apparatus of the present invention will be described.

Figure 3:
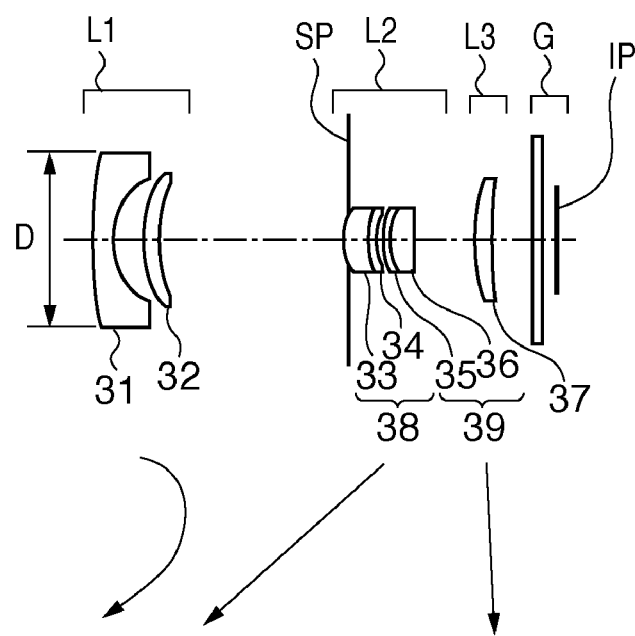
FIG. 3 is a sectional view (optical sectional view of the first numerical embodiment) showing the basic arrangement of an imaging lens according to the present invention.
Figure 6:
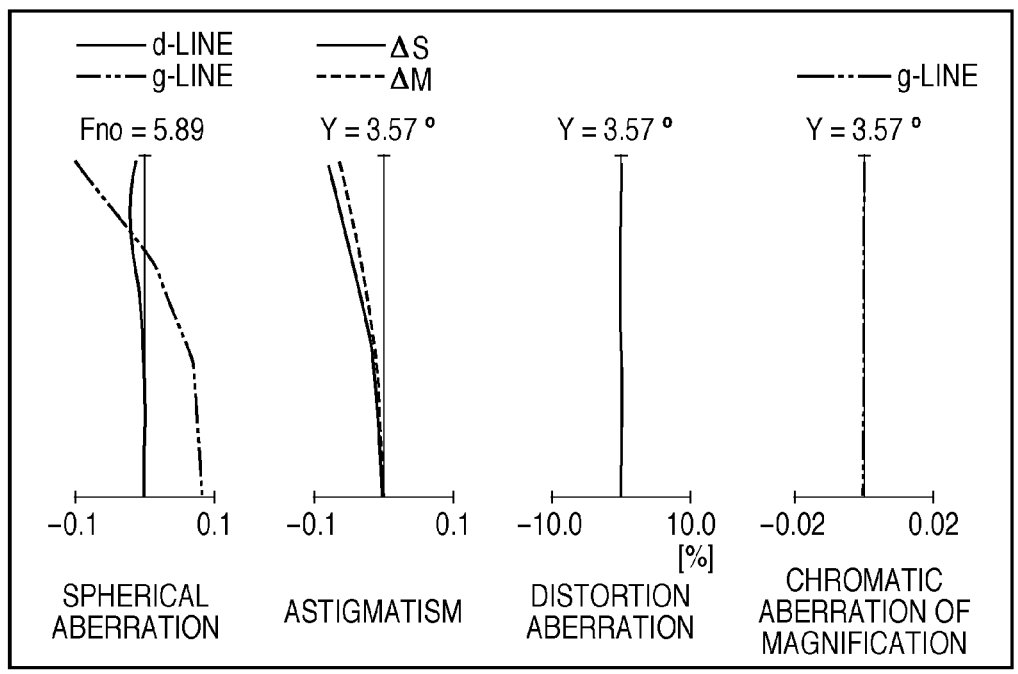
FIG. 6 is a view of aberrations on the telephoto end according to the first numerical embodiment.

FIG. 3 is a sectional view (lens sectional view) of the main part of a zoom lens on the wide-angle end in the first embodiment of the present invention. FIGS. 4 to 6 are views of aberrations of the zoom lens on the wide-angle end (short focal length side), the intermediate focal length (intermediate zoom position), and the telephoto end (long focal length side) in the first embodiment, respectively.

Figure 7:
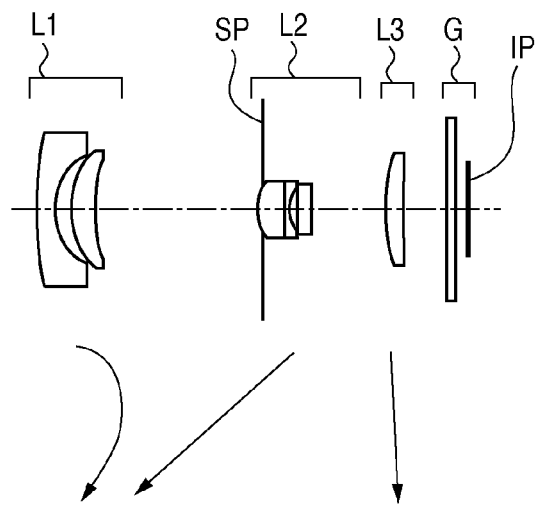
FIG. 7 is an optical sectional view of the second numerical embodiment.
Figure 10:
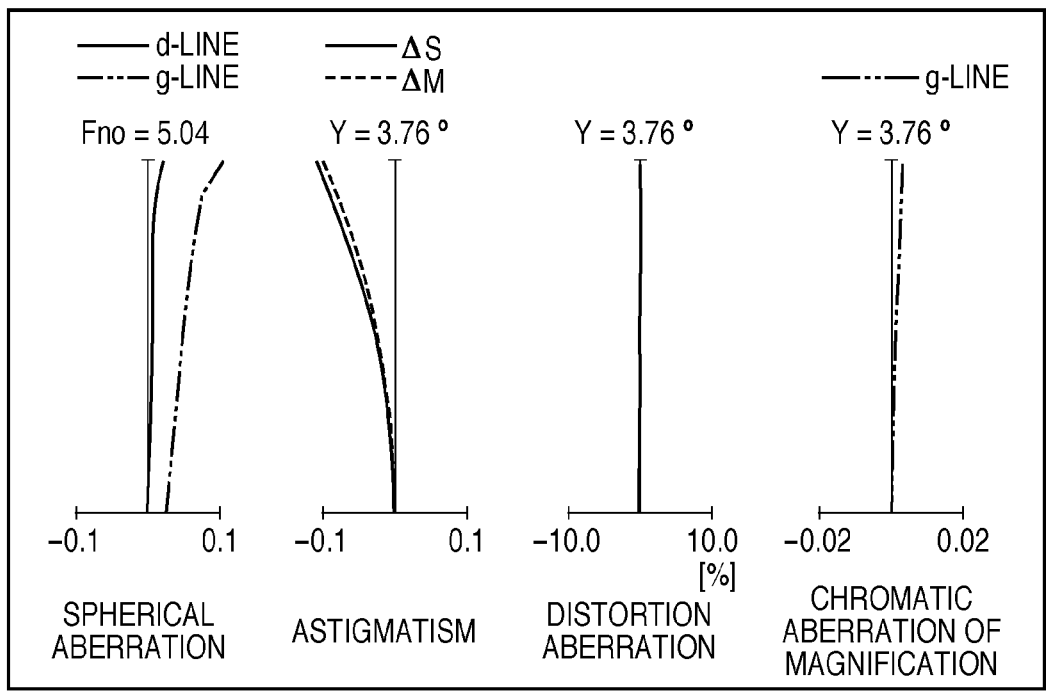
FIG. 10 is a view of aberrations on the telephoto end according to the second numerical embodiment.

FIG. 7 is a sectional view of the main part of a zoom lens on the wide-angle end in the second embodiment. FIGS. 8 to 10 are views of aberrations of the zoom lens on the wide-angle end, intermediate focal length, and telephoto end in the second embodiment, respectively.

Figure 11:
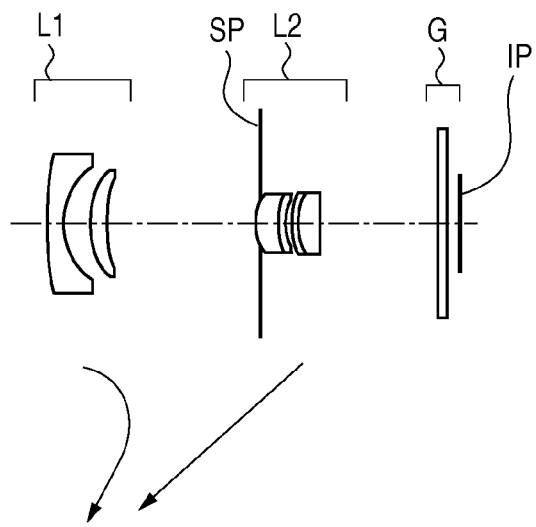
FIG. 11 is an optical sectional view of the third numerical embodiment.
Figure 12:
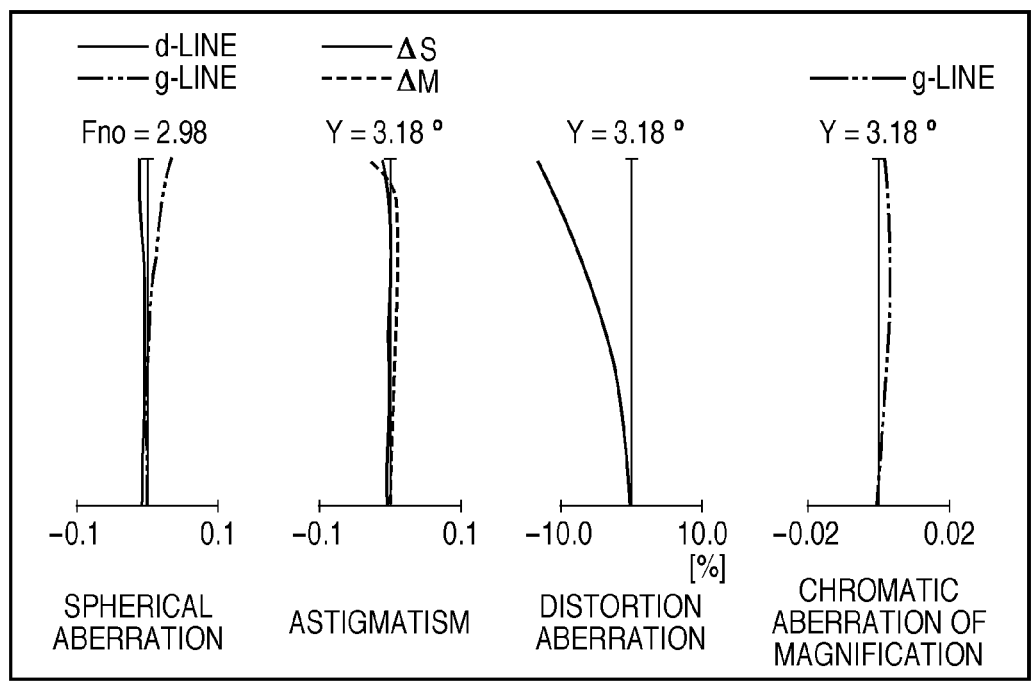
FIG. 12 is a view of aberrations on the wide-angle end according to the third numerical embodiment.
Figure 13:
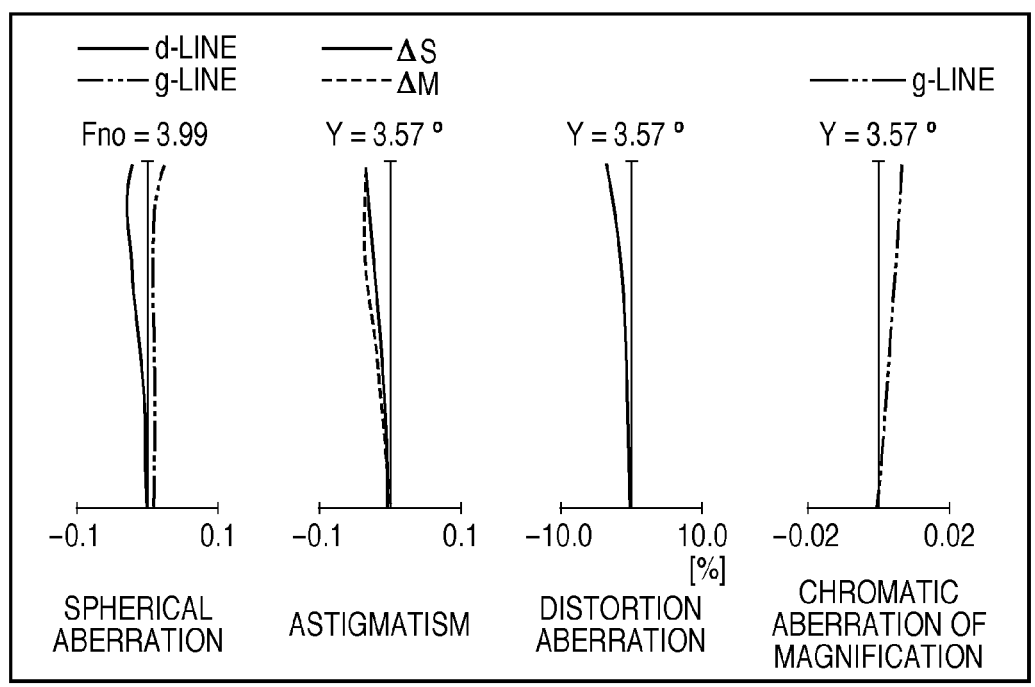
FIG. 13 is a view of aberrations at an intermediate position according to the third numerical embodiment.
Figure 14:
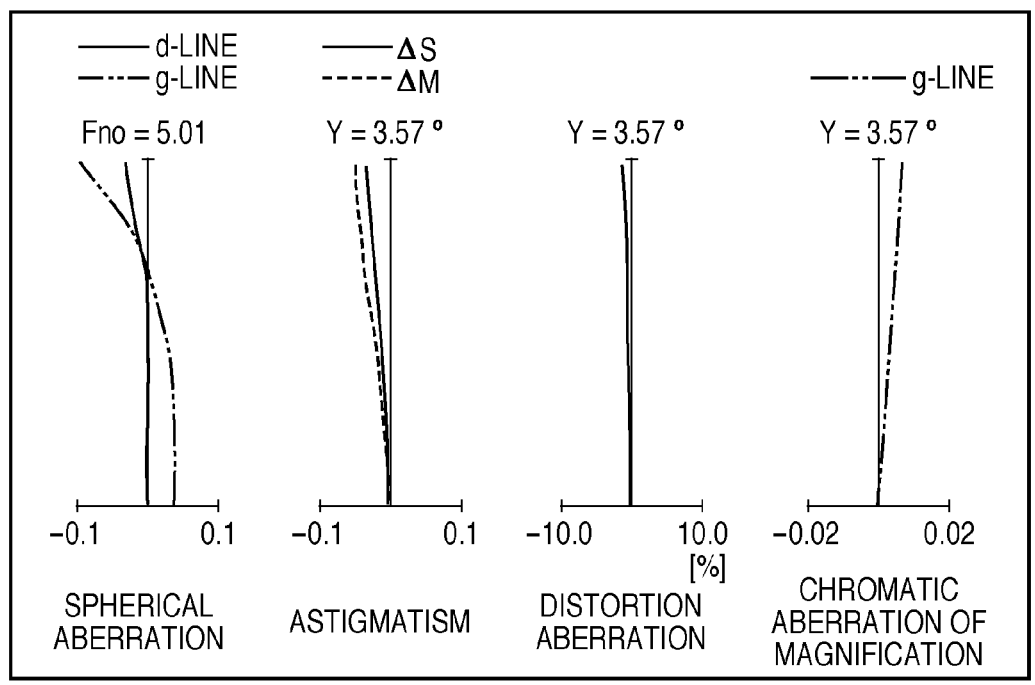
FIG. 14 is a view of aberrations on the telephoto end according to the third numerical embodiment.

FIG. 11 is a sectional view of the main part of a zoom lens on the wide-angle end in the third embodiment. FIGS. 12 to 14 are views of aberrations of the zoom lens on the wide-angle end, intermediate focal length, and telephoto end in the third embodiment, respectively.

Figure 15:
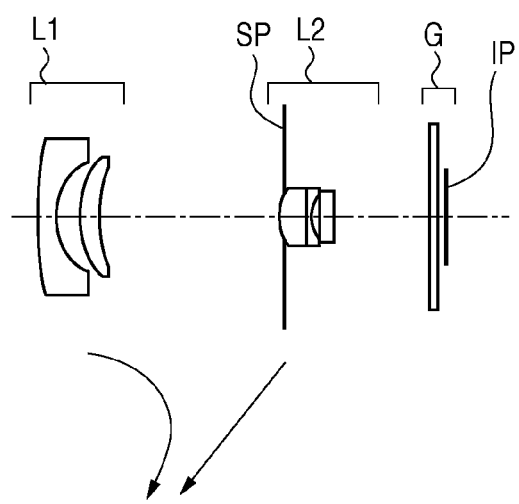
FIG. 15 is an optical sectional view of the fourth numerical embodiment.
Figure 16:
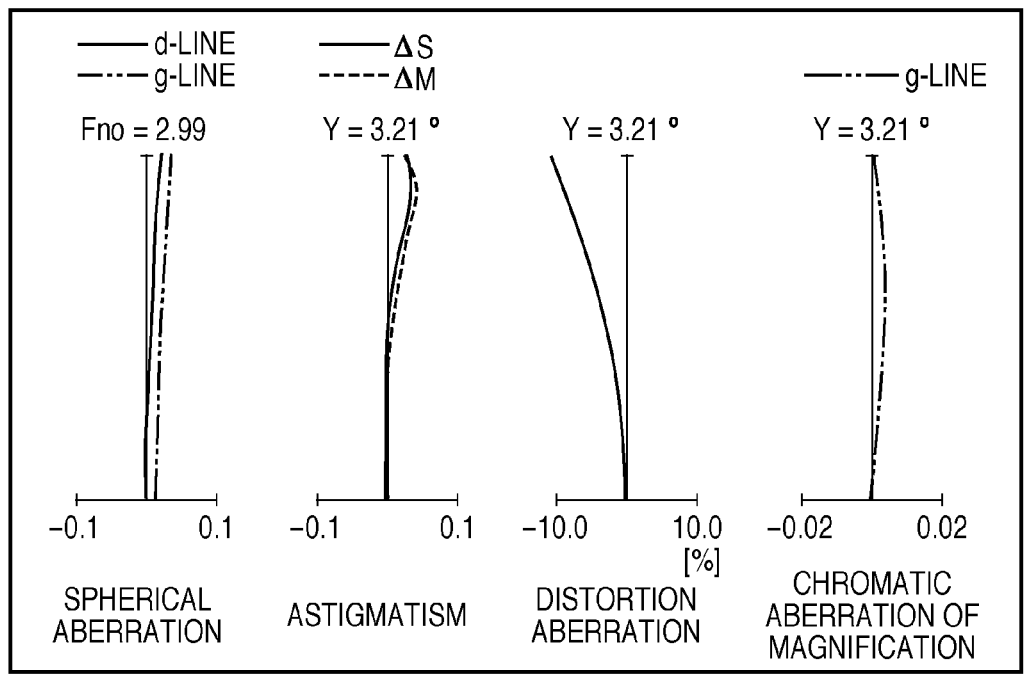
FIG. 16 is a view of aberrations on the wide-angle end according to the fourth numerical embodiment.
Figure 17:
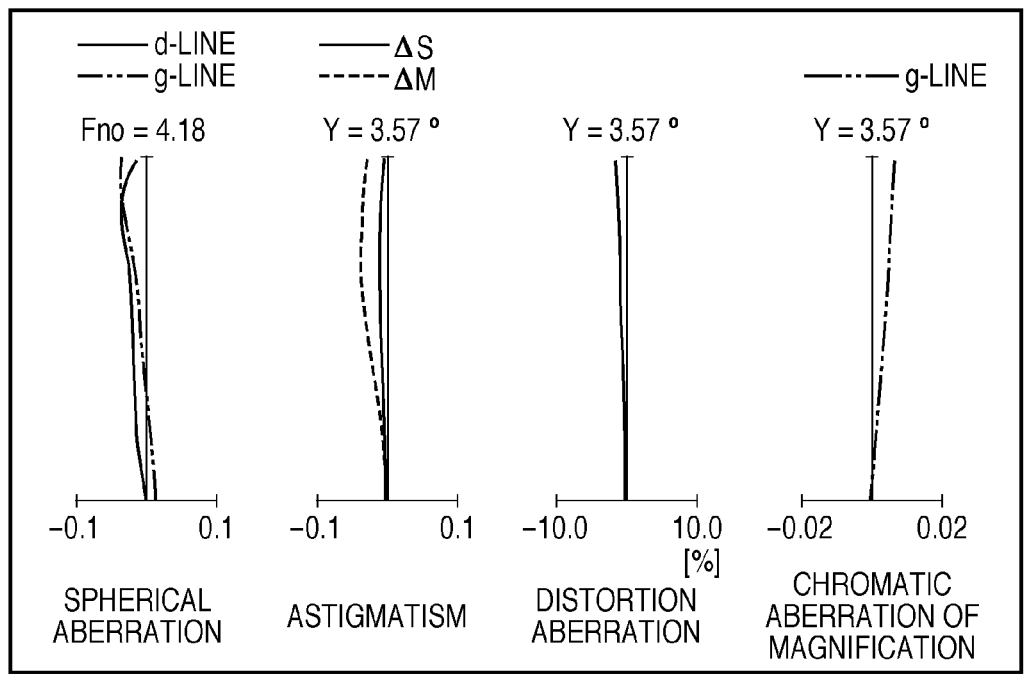
FIG. 17 is a view of aberrations at an intermediate position according to the fourth numerical embodiment.
Figure 18:
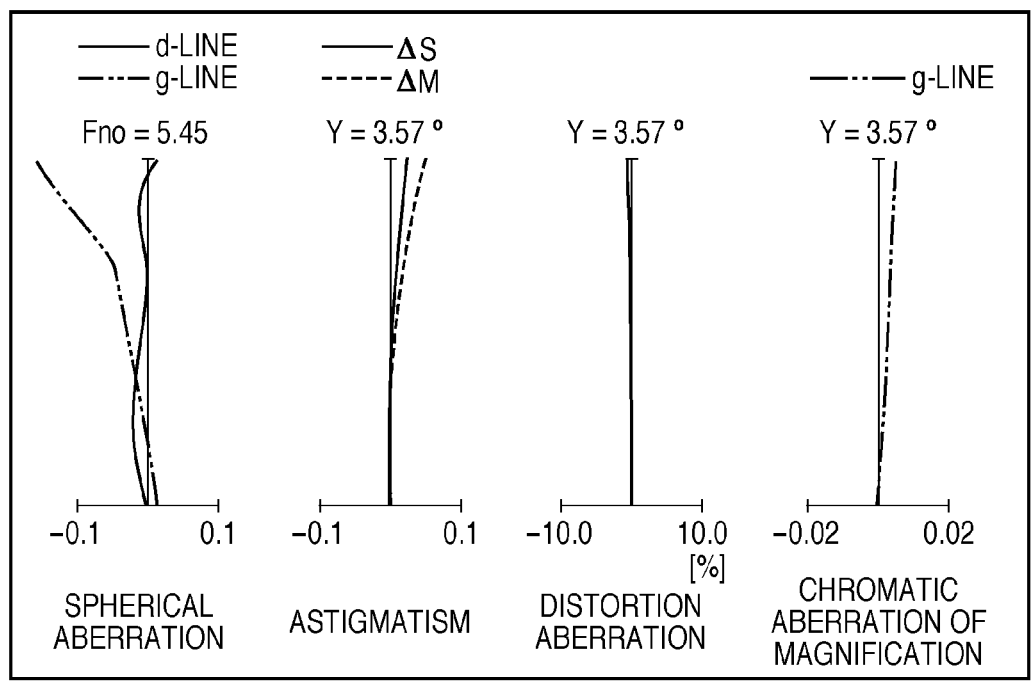
FIG. 18 is a view of aberrations on the telephoto end according to the fourth numerical embodiment.

FIG. 15 is a sectional view of the main part of a zoom lens on the wide-angle end in the fourth embodiment. FIGS. 16 to 18 are views of aberrations of the zoom lens on the wide-angle end, intermediate focal length, and telephoto end in the fourth embodiment, respectively.

Figure 19:
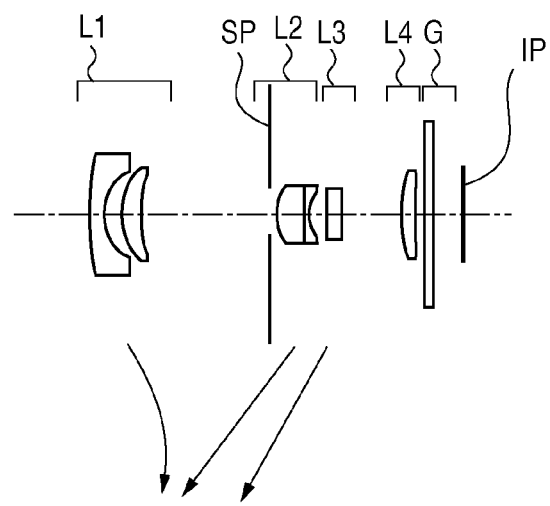
FIG. 19 is an optical sectional view of the fifth numerical embodiment.
Figure 20:
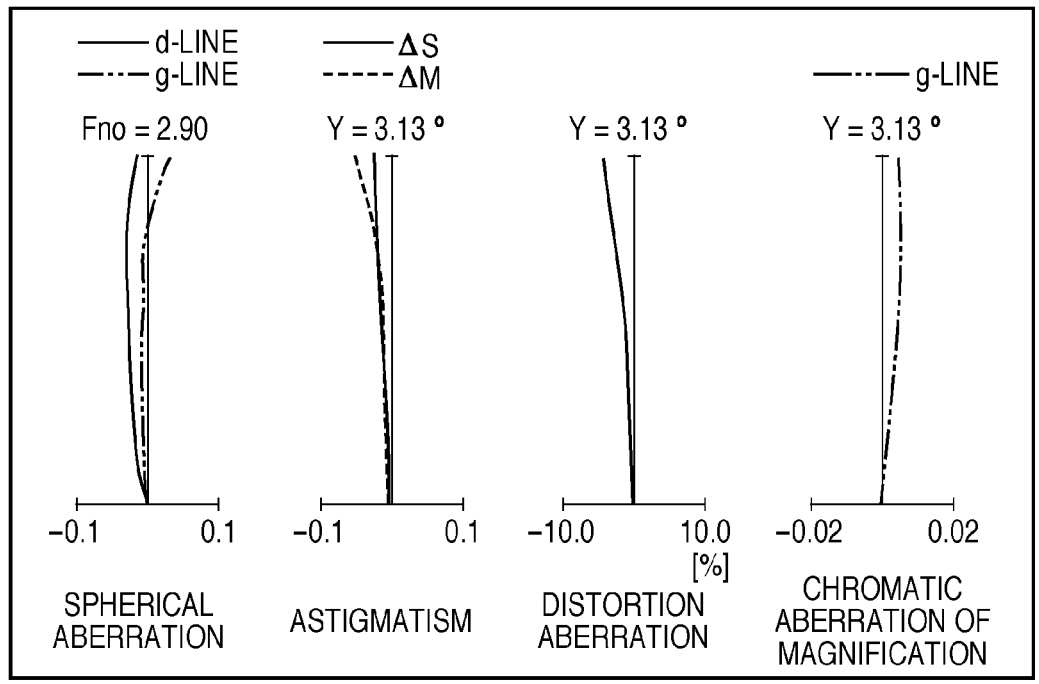
FIG. 20 is a view of aberrations on the wide-angle end according to the fifth numerical embodiment.
Figure 21:
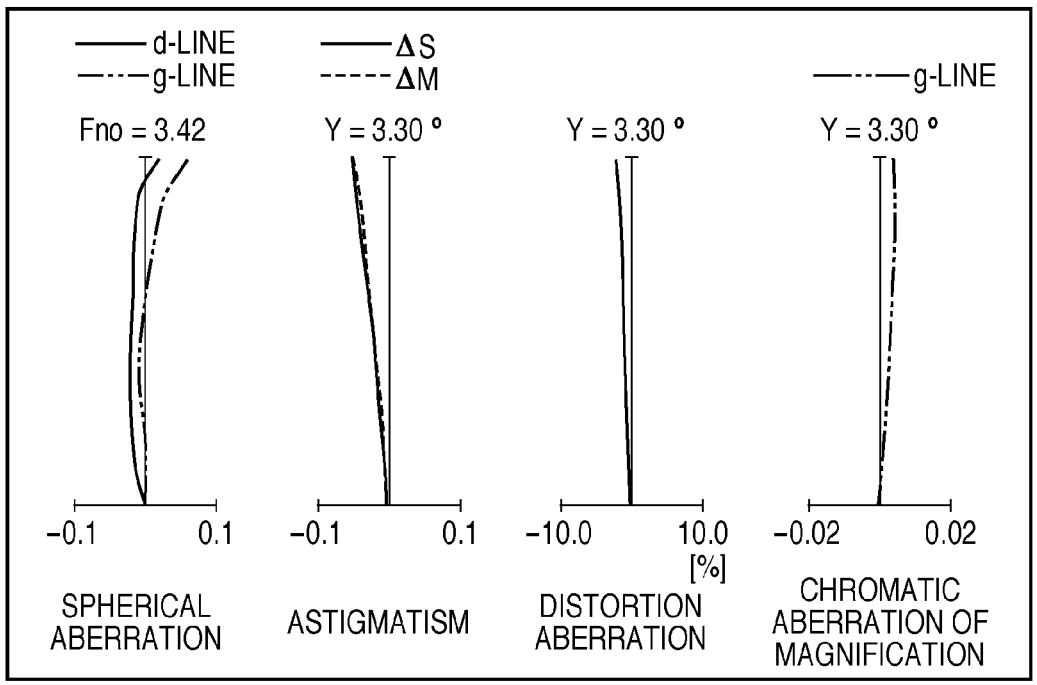
FIG. 21 is a view of aberrations at an intermediate position according to the fifth numerical embodiment.
Figure 22:
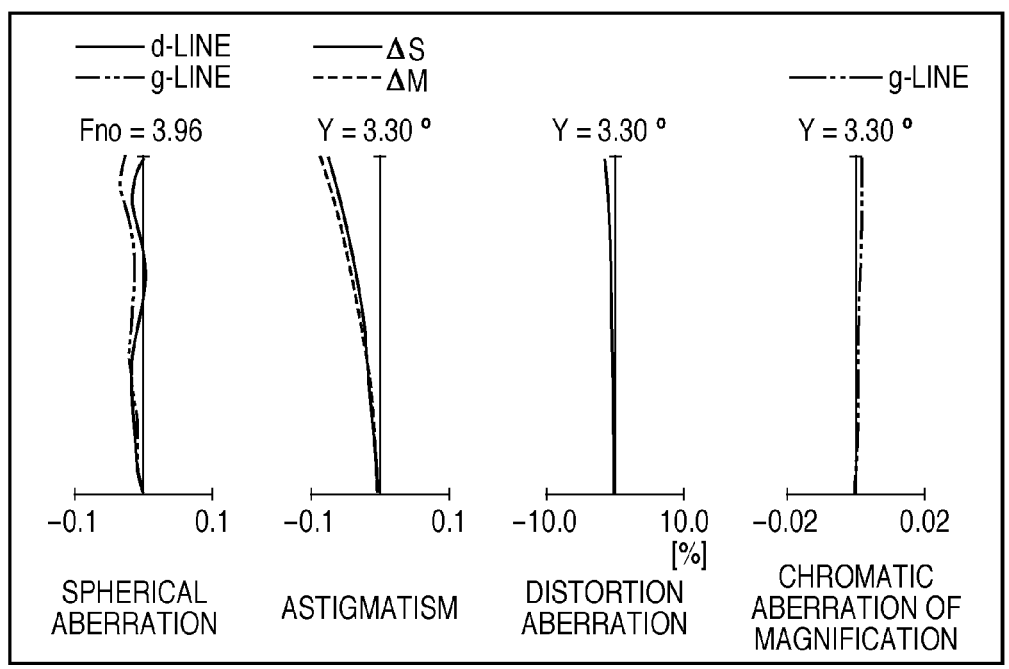
FIG. 22 is a view of aberrations on the telephoto end according to the fifth numerical embodiment.

FIG. 19 is a sectional view of the main part of a zoom lens on the wide-angle end in the fifth embodiment. FIGS. 20 to 22 are views of aberrations of the zoom lens on the wide-angle end, intermediate focal length, and telephoto end in the fifth embodiment, respectively.

An embodiment of a digital still camera using the zoom lens described in one of the first to fifth embodiments as a photographing optical system will be described with reference to FIG. 23.

Figure 23:
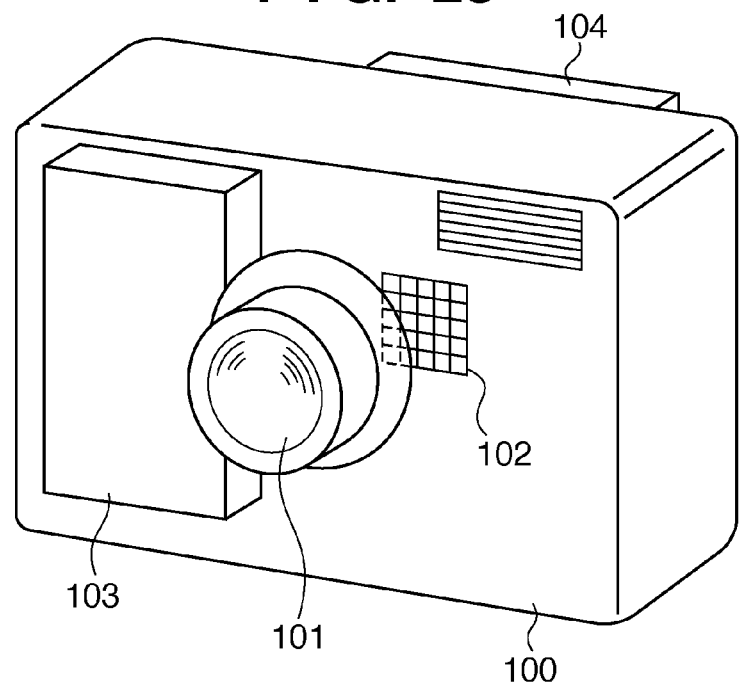
FIG. 23 is a perspective view showing a digital still camera using the zoom lens according to one of the first to fifth embodiments as a photographing optical system.

In FIG. 23, reference numeral 100 denotes a camera body; and 101, a photographing optical system formed from a zoom lens described in one of the first to fifth embodiments. A solid-state image sensor (photoelectric conversion element) 102 such as a CCD sensor or CMOS sensor is incorporated in the camera body, and receives an object image formed by the photographing optical system 101. A memory 103 stores information corresponding to the object image photoelectrically converted by the solid-state image sensor 102. A viewfinder 104 is formed from a liquid crystal display panel or the like, and used to observe an object image formed on the solid-state image sensor 102.

A zoom lens in each embodiment is an imaging lens system used in an image capturing apparatus such as a video camera or digital camera. In each lens sectional view, the left side is the object side (front), and the right side is the image side (back).

In each lens sectional view, i represents the order of a lens unit from the object side, and Li represents the ith lens unit.

A zoom lens in each embodiment has, sequentially from the object side to the image side, a first lens unit L1 of negative refractive power (optical power=the reciprocal of a focal length) and a second lens unit L2 of positive refractive power.

Reference symbol SP denotes an aperture stop; and G, an optical block corresponding to an optical filter, face plate, crystal low-pass filter, infrared cut filter, or the like.

Reference symbol IP denotes an image plane which corresponds to the image sensing plane of a solid-state image sensor (photoelectric conversion element) such as a CCD sensor or CMOS sensor when the zoom lens is used as the imaging optical system of a video camera or digital still camera.

In each aberration view, d and g represent a d-line and g-line, respectively. ΔM and ΔS represent the meridional image plane and sagittal image plane. Chromatic aberration of magnification is represented by the g-line. Y represents the image height. Fno represents the F-number.

In the following embodiments, the wide-angle end and telephoto end mean zoom positions when the lens unit for zooming (second lens unit L2) is positioned on the two ends of a range where the lens unit is movable on the optical axis of the mechanism.

Each arrow indicates the moving locus of each lens unit in zooming from the wide-angle end to the telephoto end.

The basic arrangement and function of a zoom lens in the first embodiment in FIG. 3 will be explained.

In the first embodiment, the zoom lens has, sequentially from the object side to the image side, a first lens unit L1 of negative refractive power, a second lens unit L2 of positive refractive power, and a third lens unit L3 of positive refractive power. In zooming from the wide-angle end to the telephoto end, the second lens unit L2 moves to the object side, and the third lens unit L3 slightly moves to the image side. Movement of the image point (image plane) upon zooming is corrected by moving the first lens unit L1 to the image side along a convex locus.

An aperture stop SP is arranged slightly close to the image side from the most object-side lens surface of the second lens unit L2. By arranging the aperture stop SP at this position, the interval between the first lens unit L1 and the second lens unit L2 on the telephoto end can be narrowed to ensure a large moving amount of the second lens unit L2 toward the object side in zooming.

This can prevent an increase in total lens length on the telephoto end while increasing the zoom ratio. To adjust the light quantity, a stop unit capable of reducing the light quantity at small steps, an ND filter, or the like may also be arranged on the image side of the second lens unit L2 so as to be insertable/removable into/from the optical path.

The third lens unit L3 has positive refractive power. Telecentric image formation on the image side that is necessary for an image capturing apparatus using a solid-state image sensor and the like is achieved by assigning the third lens unit L3 a role of the field lens.

The third lens unit L3 slightly moves to the image side in zooming from the wide-angle end to the telephoto end, but may also be fixed. When the third lens unit L3 is fixed, a mechanical member, actuator, and the like for driving it can be omitted.

When the third lens unit L3 moves during zooming, it is preferable that the third lens unit L3 not move to the object side in zooming from the wide-angle end to the telephoto end. If the third lens unit L3 moves to the object side, the magnification of the third lens unit L3 decreases, decreasing the zoom ratio of the entire system.

To increase the zoom ratio, therefore, it is preferable to widen the interval between the second lens unit L2 and the third lens unit L3 in zooming from the wide-angle end to the telephoto end. The zooming effect is further enhanced by moving the third lens unit L3 toward the image side in zooming from the wide-angle end to the telephoto end.

The first lens unit L1 has, sequentially from the object side to the image side, a negative lens 31 with a concave surface facing the image side, and a meniscus positive lens 32 with a convex surface facing the object side. This arrangement satisfactorily corrects aberrations while downsizing the entire system with a small number of lenses. Especially by using an aspherical surface for the first lens unit L1, distortion aberration and curvature of field on the wide-angle end, and spherical aberration on the telephoto end can be sufficiently corrected.

In the first embodiment, the two lens surfaces of the negative lens 31 are aspherical. The aspherical shape weakens negative refractive power from the center to periphery of the lens, and aberrations are corrected in the above-described manner.

The second lens unit L2 has, sequentially from the object side, a cemented lens 38 which is made up of a positive lens 33 and negative lens 34 and has positive refractive power as a whole, and a cemented lens 39 which is made up of a negative lens 35 and positive lens 36 and has positive refractive power as a whole. Since the second lens unit L2 readily suffers aberration variations upon zooming, it adopts a relatively symmetrical lens arrangement to reduce aberration variations upon zooming.

The second lens unit L2 forms an image at an equal magnification at an intermediate zoom position, and thus employs an arrangement of positive, negative, negative, and positive lenses, which is a development of a triplet. This arrangement satisfactorily corrects aberrations and reduces aberration variations upon zooming.

When increasing the zoom range, this lens arrangement is very effective for correcting aberration. The most object-side positive lens 33 in the second lens unit L2 greatly refracts an off-axis principal ray emerging from the first lens unit L1. To reduce generation of oblique aberrations, the positive lens 33 has a convex shape on the object side.

The positive lens 33 preferably has a convex shape on the object side in order to even suppress the amount of spherical aberration generated with respect to an axial ray divergently emerging from the first lens unit L1. Further, the positive lens 33 desirably has an aspherical object-side lens surface. In this case, spherical aberration upon increasing the diameter can be sufficiently corrected.

The negative lens 34 has a lens shape with a concave surface facing the image side. Coma generated on the object-side lens surface of the positive lens 33 can be corrected on the image-side lens surface of the negative lens 34. With these shapes, the positive lens 33 and negative lens 34 satisfactorily correct both spherical aberration and coma.

The cemented lens 38 made up of the positive lens 33 and negative lens 34 has a meniscus shape as a whole. This shape cannot greatly increase refractive power. Hence, in the first embodiment, the cemented lens 39 on the image side mainly gives positive refractive power of the second lens unit L2.

By this lens arrangement, generation of aberration in the second lens unit L2 upon increasing the zoom ratio is reduced in the entire zoom range, and a low-profile lens arrangement is provided.

The positive lens 33 and negative lens 34 need not be formed into the cemented lens 38, and may also be divided as long as spherical aberration and coma are satisfactorily corrected. The cemented lens 38 may also be replaced with one meniscus positive lens with a convex surface facing the object side. It suffices to correct chromatic aberration generated in this case by the cemented lens 39.

The third lens unit L3 has a single positive lens 37, and forms a telecentric system as a whole.

The third lens unit L3 having a small number of lenses performs focusing, which easily downsizes the focusing lens unit.

A zoom lens in the second embodiment in FIG. 7 is a 3-unit zoom lens of the same zoom type as the zoom lens in the first embodiment in FIG. 3.

The zoom lens in the second embodiment has the same arrangement as that of the zoom lens in the first embodiment except that a single positive lens having two convex surfaces replaces the cemented lens 39 which forms the second lens unit L2 and includes the negative lens 35 and positive lens 36.

The second embodiment decreases the number of lenses from that in the first embodiment, and further downsizes the entire lens system while maintaining high optical performance.

A zoom lens in the third embodiment in FIG. 11 is a 2-unit zoom lens which has, sequentially from the object side to the image side, a first lens unit L1 of negative refractive power and a second lens unit L2 of the positive refractive power, and performs zooming by changing the interval between the two lens units.

The lens arrangements of the first lens unit L1 and second lens unit L2 in the third embodiment are the same as those of the first lens unit L1 and second lens unit L2 in the first embodiment in FIG. 3. The third embodiment obtains the same effects as those of the first embodiment.

The zoom lens in the third embodiment omits the third lens unit L3, unlike the zoom lens in the first embodiment. The third embodiment further enhances the effects of the entire system while maintaining high optical performance.

There has conventionally been known a collapsible zoom lens which downsizes the entire system by narrowing the intervals between lens units in a non-image sensing state. The third embodiment is superior to the first and second embodiments in downsizing of the whole image capturing apparatus because the third lens unit is omitted to shorten the total lens length when the lens system collapses.

The absence of the third lens unit makes it more difficult in the third embodiment than the first and second embodiments to set the exit pupil fully apart from the image plane and ensure telecentricity. For this reason, the image capturing apparatus according to the third embodiment preferably adopts a solid-state image sensor capable of capturing a sufficient quantity of light even with a large incident angle. In the third embodiment, the first lens unit L1 performs focusing.

A zoom lens in the fourth embodiment in FIG. 15 is a 2-unit zoom lens of the same zoom type as the zoom lens formed from two lens units in the third embodiment in FIG. 11.

The lens arrangements of a first lens unit L1 and second lens unit L2 in the fourth embodiment are the same as those of the first lens unit L1 and second lens unit L2 in the second embodiment in FIG. 7, and obtains the same effects.

The zoom lens in the fourth embodiment includes two lens units as a whole, and obtains the same effects as those of the zoom lens in the third embodiment.

A zoom lens in the fifth embodiment in FIG. 19 includes, sequentially from the object side to the image side, a first lens unit L1 of negative refractive power, a second lens unit L2 of positive refractive power, a third lens unit L3 of positive refractive power, and a fourth lens unit L4 of positive refractive power. This zoom lens is a 4-unit zoom lens which performs zooming by moving the first to third lens units.

In zooming from the wide-angle end to the telephoto end by the zoom lens in the fifth embodiment, the first lens unit L1 moves to the image side along a convex locus. The second lens unit L2 moves to the object side to decrease the interval between the second lens unit L2 and the first lens unit L1. The third lens unit L3 moves to the object side to increase the interval between the third lens unit L3 and the second lens unit L2.

In zooming, the second lens unit L2 and third lens unit L3 move independently by different distances. In zooming, the fourth lens unit L4 does not move.

The zoom lens in the fifth embodiment performs main zooming by moving the second lens unit L2, and corrects movement of the image point upon zooming by moving the first lens unit L1. In the fifth embodiment, the third lens unit L3 performs focusing.

The fourth lens unit L4 functions as a field lens similarly to the third lens unit L3 in the first embodiment. In zooming, the second lens unit L2 and third lens unit L3 individually move to reduce aberration variations accompanying zooming.

The use of an inner focus method of performing focusing by the third lens unit L3 increases the focus sensitivity, compared to a rear focus method. As a result, the focus moving amount decreases, downsizing the driving means.

An arrangement common to zoom lenses which build image capturing apparatuses in the respective embodiments is a negative lead type zoom lens having the first lens unit L1 of negative refractive power and the second lens unit L2 of positive refractive power sequentially from the object side.

As shown in FIG. 3, let D be the outer diameter of the most object-side negative lens 31 of the first lens unit L1. In the negative lead type, the outer diameter D is determined by the refractive height of the most off-axis beam on the wide-angle end.

When no distortion aberration is corrected, the imaging point, corresponding to the most off-axis beam in FIG. 2 is the end point 24 at the length L of the diagonal line, and the image height is given by L/2. When correcting distortion aberration, the imaging point corresponding to the most off-axis beam in FIG. 2 is the end point 23 at the length Ld of the diagonal line, and the image height is given by Ld/2.

The image height Ld/2 is smaller than L/2, so the refractive height of the first lens unit L1 becomes small. Hence, the outer diameter D of the negative lens 31 can be decreased.

Each embodiment decreases the outer diameter D of the lens on the premise that distortion aberration is electrically corrected on the wide-angle end.

At this time, a larger distortion aberration on the wide-angle end decreases the outer diameter D, decreasing the front lens diameter. However, if the distortion aberration correction amount is excessively large, the image quality degrades upon pixel interpolation.

To prevent this, each embodiment determines a correction amount at which degradation of the image quality by interpolation processing is negligible, thereby achieving both maintenance of the image quality and a decrease in the outer diameter D of the lens.

In the following numerical embodiments corresponding to the respective embodiments, the outer diameter D of the lens is set larger by about 1 mm than the effective diameter of a beam on the object-side lens surface of the negative lens 31.

To generate distortion aberration to a certain degree on the wide-angle end, the curvature of each lens surface of the first lens unit L1 in each embodiment is reduced to a certain degree. If the lens surface is concentric to an off-axis beam on the wide-angle end, distortion aberration is corrected. However, each embodiment generates barrel distortion aberration by reducing the curvature from that in the concentric state.

However, an excessively reduced curvature causes a large amount of astigmatism on the wide-angle end, so the curvature needs to be properly set within a given range. In each embodiment, the negative lens 31 is an aspheric lens. In this case, not the paraxial curvature but the curvature of a reference spherical surface is preferably reduced to a certain degree.

The reference spherical surface means a spherical surface including the vertex of the lens surface and a point on the effective optical diameter.

The first to fifth numerical embodiments corresponding to the first to fifth embodiments of the present invention will be described. In each numerical embodiment, i represents the order of surfaces from the object side. Ri represents the radius of curvature of the lens surface. Di represents the lens thickness and air gap between the ith and (i+1)th surfaces. Ndi and vdi represent the refractive index and Abbe number for the d-line. Two surfaces on the most image side are those of a filter member such as a crystal low-pass filter or infrared cut filter.

B, C, D, E, and F are aspheric coefficients. Letting x be the displacement along the optical axis at the position of a height H from the optical axis by using the surface vertex as a reference, x is given by $$x = \frac{(1/R)H^2}{1+\sqrt{1-(1+K)\frac{(H/R)^2}{}}} + BH^4 + CH^6 + DH^8 + EH^{10} + FH^{12} \quad (1)$$

where R is the radius of curvature, and K is the conic coefficient.

BF represents a distance in air conversion from the final lens surface to a paraxial image plane. The total lens length is obtained by adding BF to the distance from the front lens surface to the final lens surface.

j represents the order of lens units counted from the object side, and fj represents the focal length of the jth lens unit.

The unit of items regarding the length such as the radius of curvature, lens thickness, air gap, focal length, image height, total lens length, and BF is mm.

In the following description, the length Ld of the diagonal line of the image capturing area at each zoom position corresponds to double the image height.

Table 1 shows the relationship between the above-described conditional expressions and numerical values in the numerical embodiments.

[Numerical Embodiment 1]
f = 4.69 to 18.01
Fno = 2.81 to 5.89
2ω = 71.1° to 21.1°

Surface Data

| R1* = 52.277 | D1 = 1.35 | Nd1 = 1.848616 | vd1 = 40.1 |
|---|---|---|---|
| R2* = 4.843 | D2 = 2.14 | Nd2 = 1.945950 | vd2 = 18.0 |
| R3 = 8.542 | D3 = 1.43 | Nd3 = 1.766140 | vd3 = 49.5 |
| R4 = 14.724 | D4 = variable | Nd4 = 1.698947 | vd4 = 30.1 |
| R5 = stop | D5 = −0.49 | Nd5 = 1.846660 | vd5 = 23.9 |
| R6* = 4.267 | D6 = 1.94 | Nd6 = 1.638539 | vd6 = 55.4 |
| R7 = 9.704 | D7 = 0.60 | Nd7 = 1.622992 | vd7 = 5.8.2 |
| R8 = 3.656 | D8 = 0.51 | Nd8 = 1.516330 | vd8 = 64.1 |
| R9 = 7.866 | D9 = 0.50 | | |
| R10 = 4.547 | D10 = 2.02 | | |
| R11 = −14.994 | D11 = variable | | |
| R12 = 14.878 | D12 = 1.35 | | |
| R13 = 89.039 | D13 = variable | | |
| R14 = ∞ | D14 = 0.50 | | |
| R15 = ∞ | | | |

Aspheric Coefficient

| R1 | k = −5.94283e+01 | B = 5.37922e−05 | C = 2.54150e−06 |
|---|---|---|---|
| | D = −6.23141e−08 | E = 4.25314e−10 | |
| R2 | k = −2.14411e+00 | B = 1.70013e−03 | C = −1.75445e−05 |
| | D = 6.85455e−07 | E = −1.15655e−08 | |
| R6 | k = −3.28891e−01 | B = −1.01018e−04 | C = 4.89488e−06 |
| | D = −5.73371e−07 | E = 3.51078e−08 | |

-continued

[Numerical Embodiment 1]
f = 4.69 to 18.01
Fno = 2.81 to 5.89
2ω = 71.1° to 21.1°

Various Data
Zoom Ratio 3.84

| | Wide Angle | Intermediate | Telephoto |
|---|---|---|---|
| Focal Length | 4.69 | 11.27 | 18.01 |
| F-Number | 2.81 | 4.32 | 5.89 |
| Angle of View | 71.1° | 35.9° | 21.1° |
| Image Height | 3.321 | 3.571 | 3.571 |
| Total Lens Length | 33.64 | 31.24 | 36.23 |
| BF | 4.71 | 4.64 | 4.22 |
| D4 | 13.38 | 3.40 | 0.81 |
| D11 | 4.19 | 11.85 | 19.85 |
| D13 | 3.06 | 2.99 | 2.57 |

Data of Zoom Lenses

| Unit | Start Surface | Focal Length |
|---|---|---|
| 1 | 1 | −10.437 |
| 2 | 5 | 9.619 |
| 3 | 12 | 28.473 |

Outer Diameter of Lens Made up of R1 and R2 12.8

[Numerical Embodiment 2]
f = 6.10 to 17.93
Fno = 2.80 to 5.04
2ω = 57.5° to 21.2°

Surface Data

| R1* = 57.921 | D1 = 1.30 | Nd1 = 1.848620 | vd1 = 40.1 |
|---|---|---|---|
| R2* = 5.061 | D2 = 1.31 | Nd2 = 1.808095 | vd2 = 22.8 |
| R3 = 7.806 | D3 = 2.00 | Nd3 = 1.848620 | vd3 = 40.1 |
| R4 = 22.311 | D4 = variable | Nd4 = 1.808095 | vd4 = 22.8 |
| R5 = ∞ | D5 = −0.53 | Nd5 = 1.696797 | vd5 = 55.5 |
| R6* = 4.331 | D6 = 1.90 | Nd6 = 1.603112 | vd6 = 60.6 |
| R7 = 16.963 | D7 = 0.50 | Nd7 = 1.516330 | vd7 = 64.1 |
| R8 = 3.659 | D8 = 0.59 | | |
| R9 = 12.861 | D9 = 1.30 | | |
| R10 = −17.453 | D10 = variable | | |
| R11 = 16.493 | D11 = 1.46 | | |
| R12 = −196.637 | D12 = variable | | |
| R13 = ∞ | D13 = 0.50 | | |
| R14 = ∞ | | | |

Aspheric Coefficient

| R1 | k = −1.83510e+02 | B = 9.35719e−05 | C = −6.03699e−07 |
|---|---|---|---|
| | D = 8.66707e−09 | E = 0.00000e+00 | |
| R2 | k = −1.88251e+00 | B = 1.26150e−03 | C = −5.48821e−06 |
| | D = 1.47361e−07 | E = 0.00000e+00 | |
| R6 | k = −2.99134e−01 | B = −5.29492e−05 | C = 2.77516e−06 |
| | D = −9.02930e−08 | E = 0.00000e+00 | |

Various Data
Zoom Ratio 2.94

| | Wide Angle | Intermediate | Telephoto |
|---|---|---|---|
| Focal Length | 6.10 | 11.80 | 17.93 |
| F-Number | 2.80 | 3.91 | 5.04 |
| Angle of View | 57.5° | 35.8° | 21.2° |
| Image Height | 3.574 | 3.762 | 3.762 |
| Total Lens Length | 33.42 | 30.59 | 32.83 |

-continued

[Numerical Embodiment 2]
f = 6.10 to 17.93
Fno = 2.80 to 5.04
2ω = 57.5° to 21.2°

| | | | |
|---|---|---|---|
| BF | 4.76 | 3.72 | 3.39 |
| D4 | 13.13 | 4.75 | 1.44 |
| D10 | 5.70 | 12.28 | 18.16 |
| D12 | 3.22 | 2.18 | 1.85 |

Data of Zoom Lenses

| Unit | Start Surface | Focal Length |
|---|---|---|
| 1 | 1 | −13.806 |
| 2 | 5 | 10.434 |
| 3 | 11 | 25.295 |

Outer Diameter of Lens Made up of R1 and R2 11.9

[Numerical Embodiment 3]
f = 5.10 to 14.74
Fno = 2.98 to 5.01
2ω = 64.2° to 24.5°

Surface Data

| | | | |
|---|---|---|---|
| R1 = 224.291 | D1 = 1.35 | Nd1 = 1.900000 | vd1 = 36.0 |
| R2* = 5.316 | D2 = 2.06 | Nd2 = 1.850000 | vd2 = 15.5 |
| R3 = 8.374 | D3 = 1.43 | Nd3 = 1.766140 | vd3 = 49.5 |
| R4 = 14.796 | D4 = variable | Nd4 = 1.698947 | vd4 = 30.1 |
| R5 = stop | D5 = −0.49 | Nd5 = 1.846660 | vd5 = 23.9 |
| R6* = 4.312 | D6 = 1.94 | Nd6 = 1.638539 | vd6 = 55.4 |
| R7 = 8.758 | D7 = 0.60 | Nd7 = 1.516330 | vd7 = 64.1 |
| R8 = 3.828 | D8 = 0.51 | | |
| R9 = 8.096 | D9 = 0.50 | | |
| R10 = 4.506 | D10 = 2.02 | | |
| R11 = −10.795 | D11 = variable | | |
| R12 = ∞ | D12 = 0.60 | | |
| R13 = ∞ | | | |

Aspheric Coefficient

| | | | |
|---|---|---|---|
| R2 | k = −1.97148e+00 | B = 1.27814e−03 | C = −3.12158e−06 |
| | D = −4.36651e−07 | E = 2.04452e−08 | |
| R6 | k = −4.19922e−01 | B = −1.29795e−04 | C = 9.20263e−06 |
| | D = 2.39139e−07 | E = −2.46515e−08 | |

Various Data
Zoom Ratio 2.89

| | Wide Angle | Intermediate | Telephoto |
|---|---|---|---|
| Focal Length | 5.10 | 9.92 | 14.74 |
| F-Number | 2.98 | 3.99 | 5.01 |
| Angle of View | 64.2° | 41.0° | 24.5° |
| Image Height | 3.178 | 3.571 | 3.571 |
| Total Lens Length | 31.81 | 28.58 | 30.40 |
| BF | 9.98 | 14.48 | 18.98 |
| D4 | 11.91 | 4.18 | 1.50 |
| D11 | 8.95 | 13.45 | 17.95 |

Data of Zoom Lenses

| Unit | Start Surface | Focal Length |
|---|---|---|
| 1 | 1 | −9.329 |
| 2 | 5 | 8.713 |

Outer Diameter of Lens Made up of R1 and R2 10.9

[Numerical Embodiment 4]
f = 4.70 to 16.48
Fno = 2.99 to 5.45
2ω = 71.0° to 23.0°

Surface Data

| | | | |
|---|---|---|---|
| R1 = 55.315 | D1 = 1.30 | Nd1 = 1.851350 | vd1 = 40.1 |
| R2* = 5.260 | D2 = 1.96 | Nd2 = 1.954950 | vd2 = 18.0 |
| R3 = 8.313 | D3 = 1.50 | Nd3 = 1.768020 | vd3 = 49.2 |
| R4 = 13.243 | D4 = variable | Nd4 = 1.808095 | vd4 = 22.8 |
| R5 = stop | D5 = −0.40 | Nd5 = 1.772499 | vd5 = 49.6 |
| R6* = 3.910 | D6 = 1.95 | Nd6 = 1.516330 | vd6 = 64.1 |
| R7 = 11.356 | D7 = 0.60 | | |
| R8* = 3.426 | D8 = 0.51 | | |
| R9* = 8.493 | D9 = 1.50 | | |
| R10* = −19.771 | D10 = variable | | |
| R11 = ∞ | D11 = 0.60 | | |
| R12 = ∞ | | | |

Aspheric Coefficient

| | | | |
|---|---|---|---|
| R2 | k = −2.26861e+00 | B = 1.52773e−03 | C = −1.32355e−05 |
| | D = 1.52845e−07 | E = 2.28145e−09 | |
| R6 | k = −4.83611e−01 | B = −4.17348e−04 | C = 2.18560e−05 |
| | D = 0.00000e+00 | E = 0.00000e+00 | |
| R8 | k = −3.28633e−01 | B = −1.79423e−03 | C = −1.71123e−04 |
| | D = 0.00000e+00 | E = 0.00000e+00 | |
| R9 | k = −1.50823e+00 | B = −1.85622e−04 | C = −3.45234e−04 |
| | D = 4.76923e−05 | E = −2.73589e−06 | |
| R10 | k = −1.06527e+01 | B = 7.73037e−04 | C = −1.15197e−05 |
| | D = 1.366386e−05 | E = 4.83903e−06 | |

Various Data
Zoom Ratio 3.51

| | Wide Angle | Intermediate | Telephoto |
|---|---|---|---|
| Focal Length | 4.70 | 10.59 | 16.48 |
| F-Number | 2.99 | 4.18 | 5.45 |
| Angle of View | 71.0° | 37.9° | 23.0° |
| Image Height | 3.214 | 3.571 | 3.571 |
| Total Lens Length | 32.70 | 26.08 | 27.42 |
| BF | 8.86 | 13.36 | 17.86 |
| D4 | 14.93 | 3.81 | 0.64 |
| D10 | 7.86 | 12.36 | 16.86 |

Data of Zoom Lenses

| Unit | Start Surface | Focal Length |
|---|---|---|
| 1 | 1 | −11.086 |
| 2 | 5 | 8.464 |

Outer Diameter of Lens Made up of R1 and R2 13.5

[Numerical Embodiment 5]
f = 5.24 to 10.58
Fno = 2.90 to 3.96
2ω = 62.8° to 33.7°

Surface Data

| | | | |
|---|---|---|---|
| R1 = 71.805 | D1 = 1.20 | Nd1 = 1.851350 | vd1 = 40.1 |
| R2* = 3.756 | D2 = 1.14 | Nd2 = 1.846660 | vd2 = 23.9 |
| R3 = 6.549 | D3 = 1.70 | Nd3 = 1.740130 | vd3 = 49.2 |
| R4 = 25.834 | D4 = variable | Nd4 = 1.833100 | vd4 = 23.9 |
| R5 = stop | D5 = 0.60 | Nd5 = 1.603112 | vd5 = 60.6 |
| R6* = 4.131 | D6 = 1.90 | Nd6 = 1.696797 | vd6 = 55.5 |
| R7 = −25.143 | D7 = 0.20 | Nd7 = 1.516330 | vd7 = 64.1 |
| R8 = −443.894 | D8 = 0.80 | | |
| R9* = 4.653 | D9 = variable | | |
| R10 = 29.490 | D10 = 1.20 | | |
| R11 = −12.889 | D11 = variable | | |
| R12 = 24.395 | D12 = 1.20 | | |
| R13 = ∞ | D13 = 0.52 | | |

-continued

[Numerical Embodiment 5]
f = 5.24 to 10.58
Fno = 2.90 to 3.96
2ω = 62.8° to 33.7°

| R14 = ∞ | D14 = 0.50 |
| R15 = ∞ | |

Aspheric Coefficient

| R2 | k = −1.11592e+00 | B = 1.07393e−03 | C = 7.42392e−06 |
|---|---|---|---|
| | D = −1.94030e−07 | E = −6.64122e−09 | |
| R6 | k = −5.28119e−02 | B = −1.84158e−04 | C = −1.71225e−05 |
| | D = −4.19360e−06 | E = 7.62784e−08 | |
| R9 | k = −8.26448e−01 | B = 4.08586e−03 | C = 5.19353e−04 |
| | D = −1.26718e−04 | E = 2.25765e−05 | |

Various Data
Zoom Ratio 2.02

| | Wide Angle | Intermediate | Telephoto |
|---|---|---|---|
| Focal Length | 5.24 | 7.78 | 10.58 |
| F-Number | 2.90 | 3.42 | 3.96 |
| Angle of View | 62.8° | 47.0° | 33.7° |
| Image Height | 3.131 | 3.296 | 3.296 |
| Total Lens Length | 28.96 | 27.07 | 27.22 |
| BF | 3.34 | 3.34 | 3.34 |
| D4 | 9.87 | 5.04 | 2.26 |
| D9 | 1.09 | 1.78 | 2.04 |
| D11 | 4.73 | 6.97 | 9.64 |

Data of Zoom Lenses

| Unit | Start Surface | Focal Length |
|---|---|---|
| 1 | 1 | −10.470 |
| 2 | 5 | 12.441 |
| 3 | 10 | 15.031 |
| 4 | 12 | 35.010 |

Outer Diameter of Lens Made up of R1 and R2 10.0

TABLE 1

| Conditional Expression | Numerical Embodiment | | | | |
|---|---|---|---|---|---|
| | 1 | 2 | 3 | 4 | 5 |
| (1) | 2.23 | 2.26 | 1.83 | 2.36 | 1.98 |
| (2) | 2.05 | 1.71 | 1.71 | 1.80 | 2.37 |
| (3) | 0.93 | 0.95 | 0.89 | 0.90 | 0.95 |
| (4) | 2.87 | 3.60 | 18.32 | 3.71 | 6.44 |
| (5) | 1.48 | 2.03 | 1.79 | 1.27 | 2.82 |
| (6) | 1.84862 | 1.84862 | 1.90000 | 1.85135 | 1.85135 |
| (7) | −3.62 | −4.69 | −4.48 | −4.44 | −3.76 |
| (8) | 1.05 | 0.76 | 0.95 | 1.01 | 0.75 |
| (9) | 7.53 | 5.26 | 12.37 | 11.11 | 5.27 |
| (9) Upper limit (|DIw|) | 8.96 | 6.46 | 13.80 | 11.38 | 5.42 |
| (10) | 6.1 | 4.1 | — | — | 6.5 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-257368, filed Oct. 1, 2007, which is hereby incorporated by reference herein in its entirety.

The invention claimed is:

1. An image capturing apparatus comprising:
a zoom lens;
a solid-state image sensor which photoelectrically converts an image formed by said zoom lens;
processing unit configured to process image data obtained by said solid-state image sensor; and
correction unit configured to process the image data from said processing unit to correct distortion aberration of the image formed by said zoom lens, and output the corrected image data,
wherein said zoom lens has, sequentially from an object side to an image side, a first lens unit of negative refractive power and a second lens unit of positive refractive power,
said first lens unit and said second lens unit move to narrow an interval between said first lens unit and said second lens unit in zooming from the wide-angle end to the telephoto end,
said first lens unit includes one negative lens and one positive lens,
said correction unit corrects distortion aberration in accordance with each zoom position of said zoom lens,
when said correction unit is to correct negative distortion aberration, said correction unit performs correction using image information obtained from area A smaller than a maximum image capturing area of said solid-state image sensor, and a size of a diagonal line of area A at this time is defined as a length of a diagonal line of an image capturing area, and when said correction unit does not correct negative distortion aberration, a size of a diagonal line of the maximum image capturing area of said solid-state image sensor is defined as a length of a diagonal line of an image capturing area,
letting Ldw and Ldt be lengths of diagonal lines of image capturing areas on the wide-angle end and the telephoto end, f1 be a focal length of said first lens unit of said zoom lens, f2 be a focal length of said second lens unit, fw be a focal length of an entire system on the wide-angle end, R11 and R12 be radii of curvature of an object-side lens surface and image-side lens surface of said negative lens of said first lens unit (for an aspherical surface, radii of curvature of reference spherical surfaces), and D be an outer diameter of a most object-side lens of said first lens unit, conditions:

$1.7 < |f1|/fw < 2.4$ $1.6 < f2/fw < 2.5$ $0.80 < Ldw/Ldt < 0.96$ $2.0 < (R11 \times R12)/(D \times Ldw) < 20.0$ are satisfied, and
letting R21 and R22 be radii of curvature of an object-side lens surface and image-side lens surface of said positive lens of said first lens unit (for an aspherical surface, radii of curvature of reference spherical surfaces), a condition:

$1.2 < (R21 \times R22)/(D \times Ldw) < 3.0$ is satisfied.

2. The apparatus according to claim 1, wherein letting N1n be a refractive index of a material of said negative lens of said first lens unit, a condition:

$1.83 < N1n$ is satisfied.

3. The apparatus according to claim 2, wherein letting Dlw be distortion aberration of a most off-axis beam on the wide-angle end of said zoom lens, a condition:

$0 < (1/(Ldw/Ldt) - 1) \times 100 < |Dlw|$ is satisfied.

4. The apparatus according to claim 2, wherein when said zoom lens has at least one lens unit of positive refractive power on the image side of said second lens unit, letting fk be a focal length of said most image-side lens unit of positive refractive power, a condition:

$$4.0 < fk/fw < 8.0$$

is satisfied.

5. The apparatus according to claim 1, wherein, a condition:

$$-5.0 < (R12+R21)/(R12-R21) < -3.0$$

is satisfied.

6. The apparatus according to claim 5, wherein letting Dlw be distortion aberration of a most off-axis beam on the wide-angle end of said zoom lens, a condition:

$$0 < (1/(Ldw/Ldt)-1) \times 100 < |Dlw|$$

is satisfied.

7. The apparatus according to claim 5, wherein when said zoom lens has at least one lens unit of positive refractive power on the image side of said second lens unit, letting fk be a focal length of said most image-side lens unit of positive refractive power, a condition:

$$4.0 < fk/fw < 8.0$$

is satisfied.

8. The apparatus according to claim 1, wherein letting d1 be a thickness of said first lens unit on an optical axis, a condition:

$$0.5 < d1/fw < 1.3$$

is satisfied.

9. The apparatus according to claim 8, wherein letting Dlw be distortion aberration of a most off-axis beam on the wide-angle end of said zoom lens, a condition:

$$0 < (1/(Ldw/Ldt)-1) \times 100 < |Dlw|$$

is satisfied.

10. The apparatus according to claim 8, wherein when said zoom lens has at least one lens unit of positive refractive power on the image side of said second lens unit, letting fk be a focal length of said most image-side lens unit of positive refractive power, a condition:

$$4.0 < fk/fw < 8.0$$

is satisfied.

11. The apparatus according to claim 1, wherein letting Dlw be distortion aberration of a most off-axis beam on the wide-angle end of said zoom lens, a condition:

$$0 < (1/(Ldw/Ldt)-1) \times 100 < |Dlw|$$

is satisfied.

12. The apparatus according to claim 11, wherein when said zoom lens has at least one lens unit of positive refractive power on the image side of said second lens unit, letting fk be a focal length of said most image-side lens unit of positive refractive power, a condition:

$$4.0 < fk/fw < 8.0$$

is satisfied.

13. The apparatus according claim 1, wherein when said zoom lens has at least one lens unit of positive refractive power on the image side of said second lens unit, letting fk be a focal length of said most image-side lens unit of positive refractive power, a condition:

$$4.0 < fk/fw < 8.0$$

is satisfied.

* * * * *